US005975110A

United States Patent [19]

Sharp

[11] Patent Number: 5,975,110

[45] Date of Patent: Nov. 2, 1999

[54] ADAPTER ASSEMBLY FOR ACCESSING PRIMARY PIPELINE OF A DOUBLE WALL PIPELINE SYSTEM

[76] Inventor: Bruce R. Sharp, 321 Sky Way Box 5867, Incline Village, Nev. 89450

[21] Appl. No.: 08/933,462

[22] Filed: Sep. 18, 1997

[51] Int. Cl.[6] ...................................................... G01M 3/04

[52] U.S. Cl. ....................... 137/234.6; 137/312; 137/377; 137/315; 251/76; 73/40.5 R; 73/49.1

[58] Field of Search ................................ 137/234.6, 312, 137/377, 315; 73/40.5 R, 49.1; 251/74, 76

[56] References Cited

U.S. PATENT DOCUMENTS

| | | | |
|---|---|---|---|
| 2,268,263 | 12/1941 | Newell et al. . | |
| 4,094,536 | 6/1978 | Cole et al. . | |
| 4,805,444 | 2/1989 | Webb . | |
| 4,926,899 | 5/1990 | Argandona | 137/234.6 |
| 4,932,257 | 6/1990 | Webb . | |
| 5,040,408 | 8/1991 | Webb . | |
| 5,054,523 | 10/1991 | Rink . | |
| 5,060,509 | 10/1991 | Webb . | |
| 5,098,221 | 3/1992 | Osborne . | |
| 5,301,721 | 4/1994 | Hartmann | 137/312 |
| 5,333,490 | 8/1994 | Webb . | |

*Primary Examiner*—A. Michael Chambers
*Attorney, Agent, or Firm*—Charles R. Wilson

[57] ABSTRACT

An adaptor assembly connects a primary pipeline of a double wall pipeline to a dispensing pipeline at a ground level gasoline service station dispenser unit in a manner which permits access to the primary pipeline for installation and periodic replacement purposes. The assembly includes a casing and a disengageable seal system. The casing is attached to a terminus of the secondary pipeline. The disengageable seal system is operably associated with the casing to terminate an annular space between the primary pipeline and the secondary pipeline to contain the flow of any leakage from the secondary pipeline. In some embodiments of the invention, a coupling is attached to a terminus of the primary pipeline to provide a flowpath for conveyance of gasoline. The disengageable seal system is also operably associated with the coupling. The seal system allows the primary pipeline to be accessed and removed from the double wall pipeline system without disconnecting or otherwise disturbing the secondary pipeline's connection to the casing.

35 Claims, 14 Drawing Sheets

ADAPTER ASSEMBLY FOR ACCESSING PRIMARY PIPELINE OF A DOUBLE WALL PIPELINE SYSTEM

This invention relates to an adaptor assembly for use with a double wall pipeline system. More particularly, the invention relates to an adaptor assembly for connecting a terminus of the double wall pipeline system to a ground level gasoline station dispenser unit in a manner whereby a primary supply pipeline within the pipeline system is readily accessible for replacement purposes.

BACKGROUND OF THE INVENTION

Many local, state and federal agencies require that underground storage tank systems for hazardous materials be secondarily contained. The systems generally include an underground tank, a pump containment sump located on top of the tank, and piping from the containment sump to a ground level dispenser unit. Double walled pipeline systems have recently become popular and in some locales are mandated for underground conveyance of the hazardous material. Such pipeline systems include an inner primary pipeline and an outer secondary pipeline for containing any leakage from the primary pipeline. Inclusion of a leak detection means which monitors for leakage from the inner primary pipeline is a further feature which enhances the systems. In fact, the double walled pipeline systems with leak detection capability for the primary pipeline is a cost effective way of meeting governmental leak detection requirements.

As a part of mandated safety requirements, many ground level dispenser units have pans, sometimes called dispenser sumps, at their base. The primary pipeline from the underground tank is normally under pressure when any dispenser (s) is dispensing fuel to a vehicle. Therefore, it is necessary to have an emergency safety shut-off valve interposed in the primary pipeline to stop the flow of gasoline in an emergency situation. That is, the valve is designed to close when either the dispenser unit is knocked off its mounting or a fire is started. The pan under each dispenser unit provides an area to access the primary pipeline and to install the safety valve. It also provides an area to access and replace the primary pipeline below the valve as well as to access piping above the valve which leads through the dispenser unit. U.S. Pat. No. 5,098,221, FIG. 7 illustrates a typical safety shut-off valve.

Typical dispenser pans result in a large open area under each dispenser unit. The area can collect flammable liquids or vapors which create fire and explosion hazards. The dispenser pans are also prone to fill up with ground water or rain water leaking down into the pan. Some state or local codes prohibit the secondary pipeline of the double walled pipeline system to terminate in an open manner to the interior of the dispenser pan. This is to prevent a collection of liquid or vapors which enters the pan from spreading through the secondary pipe and to the tank containment sump. As readily imagined, this is to prevent the spread of a fire emanating in the dispenser unit to the tank containment sump and possible explosion in the containment sump. The use of dispenser pans is further complicated in that most fire codes require the part of the primary pipeline of the double wall pipeline system which is within the pan to be steel piping or Underwriters Laboratories (UL) fire resistent piping. This means fiberglass and flexible plastic primary piping such as described in U.S. Pat. No. 5,098,221 must terminate underground before entering the dispenser pans.

All connector piping used within the dispenser pan must be fire resistent piping. This piping can be considerably more costly than the flexible piping used to convey the liquid from the storage tank to the dispenser pan. Because of leakage of water, flammable liquids or vapors into the dispenser pan, some fire codes require costly leak detection monitoring to detect leaks into the dispenser pan area. As mentioned above, many codes require the secondary pipeline connected to the pan be sealed so as not to let vapors/liquids from the pan into the secondary pipeline or the tank containment sump. In addition to all these requirements and precautions, dispenser pans are difficult and expensive to install in and under the concrete beneath the dispenser unit. They must be installed in a way to prevent rain or ground water from entering the pan. Many pipe and electrical conduit connections which lead into or from the dispenser pan require field installed seals. Historically, these seals have been problem areas of leakage of ground water into pans. Further heightening the problem is the fact it is costly to repair leaks into a dispenser pan during its operational life.

There are available dispenser units which do not have a dispenser pan. Secondary piping terminates in a liquid-tight sealed manner to a safety valve located at the dispenser's base. However, an associated disadvantage with this type of connection is that access to the primary pipeline is impeded. The primary pipeline is subject to deterioration and it is necessary to periodically remove it from within the secondary pipeline and replace it with new piping. Ideally, this is done without having to disconnect or disturb the secondary pipeline in any manner. It is necessary with known present systems to tamper with the secondary pipeline in any primary pipeline replacement process and this, as can be imagined, creates a whole set of new problems.

There now has been developed an adaptor assembly which allows for the installation, removal and replacement of a flexible primary supply pipeline which is connected to a dispenser unit base without unsealing and/or removing the secondary pipeline under the dispenser unit from the adaptor assembly. The adaptor assembly can be used in dispenser units as well as sumps or pans directly underneath a dispenser unit. In preferred methods of installation, the adaptor assembly eliminates the need for a fire resistant primary pipeline between the flexible primary pipeline and the safety shut-off valve.

SUMMARY OF THE INVENTION

An adaptor assembly is used to connect a double wall pipeline system directly or indirectly to a dispensing pipeline at a ground level gasoline service station dispenser unit. The double wall pipeline system has a primary pipeline for conveying a liquid and a secondary pipeline substantially concentric with the primary pipeline to form an annular space for receiving leakage. The assembly comprises a casing for attaching to a terminus of the secondary pipeline and a disengageable seal system. The seal system is operably associated with the casing and the primary pipeline. The seal system is used to terminate the annular space between the primary and secondary pipelines to contain the flow of any leakage therefrom while providing for the primary pipeline to pass through it so as to connect into the dispensing pipeline. At the same time, the seal system is disengageable to allow access to the primary pipeline for initial installation, removal and replacement purposes without having to access and disconnect the secondary pipeline from the casing.

DETAILED DESCRIPTION OF THE INVENTION

Figure 1:
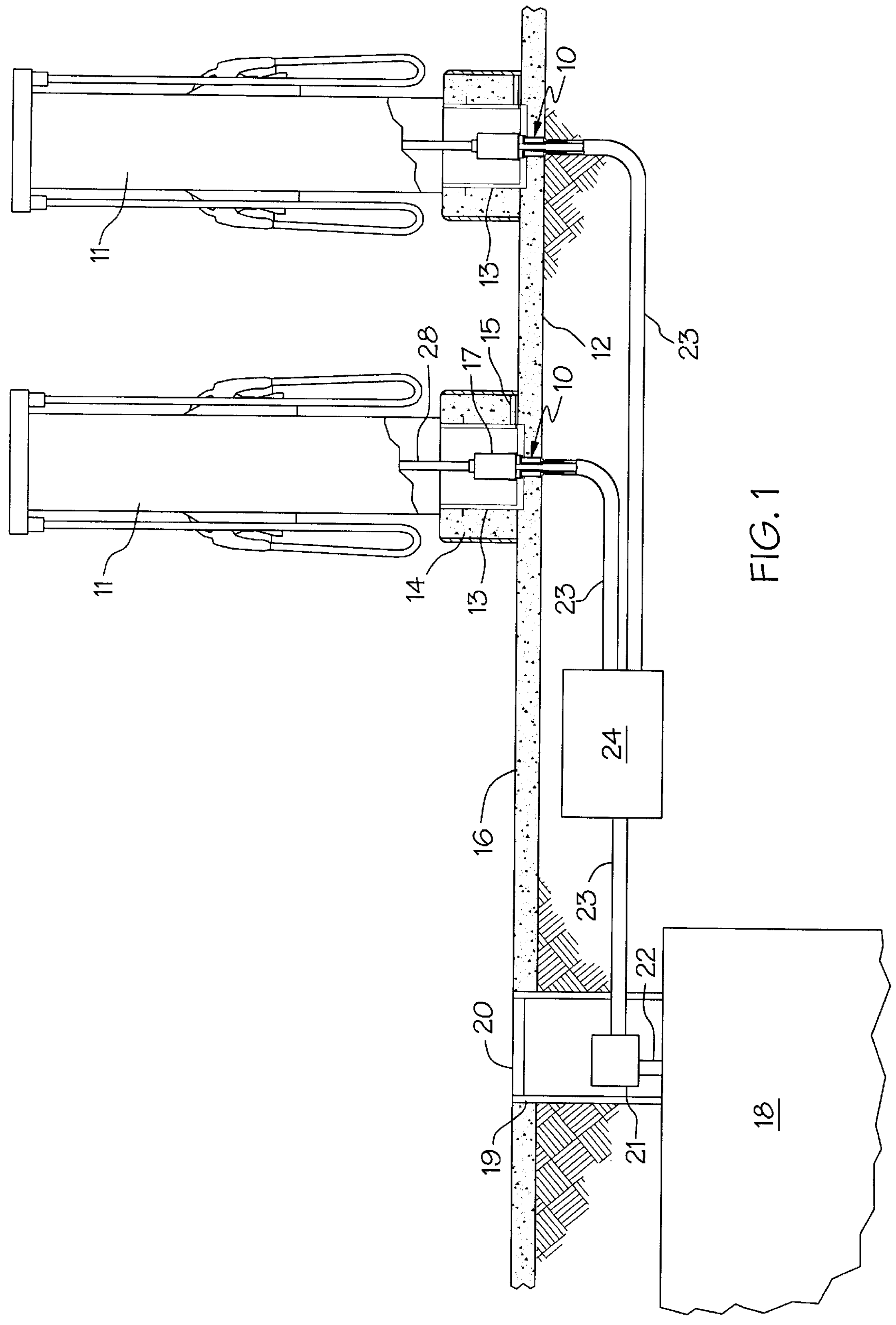
FIG. 1 is an environmental view partially in section showing a double wall pipeline system and a gasoline service station dispenser unit connected together by an adaptor assembly of the invention utilizing a casing and a disengageable seal system.

The adaptor assembly of the invention finds its greatest use with ground level dispenser units such as found at retail gasoline service stations for filling fuel tanks of vehicles. For this reason, the adaptor assembly is described below and is illustrated in the drawings with reference to such dispenser units. It can as well be used with other dispenser units which control the flow of liquid from a bulk storage tank or other containment means and which dispense to commercial vehicles or other machinery.

The adaptor assembly of the invention is operably associated with the base of a gasoline dispenser unit. Its purpose is to directly or indirectly connect a primary supply line of a double wall pipeline system to a dispenser pipeline within the dispensing unit. At the same time, the adaptor assembly terminates an annular space of the double wall pipeline system to contain any leaked liquid. Most importantly, the adaptor assembly provides a means to install, remove and replace the primary pipeline from the double wall pipeline system without a need to disconnect the secondary pipeline from the adaptor assembly. It also eliminates the need for a fire resistant connector pipeline between the primary pipeline and the safety valve.

As used herein, “base” of the dispenser unit is used to indicate a structure located at or below ground surface level and underneath the dispenser unit. Bases include a (1) a bottom well wall of the dispenser unit itself, (2) a concrete body, with or without a rigid island form, at an island station on which the dispenser unit is mounted, (3) the bottom wall of a sump positioned directly below the dispenser unit, and (4) the bottom wall of a pan positioned directly below the dispenser unit. Removal of the dispenser unit or a side panel to the dispenser unit will typically expose the interior of the base and the adaptor assembly of the invention.

With reference to FIG. 1, there is shown an adaptor assembly 10 of the invention positioned at the base of a dispenser unit 11. The base is a concrete body 12 and, as shown, preferably includes a bottom wall of a rigid island form 13 used in formation of a concrete island structure 14. The dispenser unit 11 itself is mounted on the concrete island structure 14. The concrete island structure extends up to about twelve inches above ground surface. It helps to protect the dispenser unit 11 and pipelines within and leading to it from damage by a vehicle. One or more drain holes 15 are preferably provided leading through the island form 13 and concrete island structure 14, to primarily drain rain water or leaked liquid which may collect within the area under the dispenser unit onto a concrete pad 16 of the service station.

The rigid island form 13 is used in formation of the concrete island structure and normally remains in the concrete body 12. The island form 13 is made of metal, though other materials rigid enough to retain their shape during formation of the dispenser unit base can be used. Together, the concrete body 12 and the bottom wall of the island form 13 provide the base of the dispenser unit depicted in FIGS. 1 and 2.

The dispenser unit 11 is secured to the concrete island 14 over the island form 13. A safety shut-off valve 17 within the space directly above the base is at or below the top surface of the concrete island structure 14. The valve is conventional and is commercially available. Such valves are designed to shut-off or close the primary pipeline upon the occurrence of a bumping sufficiently hard to cause structural damage or a fire at the dispenser unit. Further flow of gasoline from the primary pipeline to a dispenser pipeline within the dispenser unit is stopped.

The dispenser unit 11 has a panel (not shown) to access its interior for routine maintenance work on any component of the unit and to access the safety shut-off valve and the primary pipeline. Gasoline hoses with fueling nozzles and a control panel are also a part of the dispenser unit and operate conventionally.

Still with reference to FIG. 1, an underground storage tank 18 is used to store the gasoline. It typically has a capacity of 10,000 to 20,000 gallons liquid, though can be smaller or larger. An access way 19 extends downwardly from ground surface, through the concrete pad 16, and to the top surface of the storage tank 18. A removable cover 20 is used to enter the access way 19 for periodic maintenance work on a pump 21 positioned in the access way 19 or piping 22 connecting the pump 21 to the storage tank 18. Access ways are further described in U.S. Pat. Nos. 5,134,878 and 5,136,877.

A double wall pipeline system 23 leads from the pump 21 through a wall of the access way 19 and to a distribution box 24. A manifold (not shown) or other distribution means within the distribution box 24 splits the flow of gasoline into separate pipelines which lead directly to one or more (two as shown) dispenser units 11. Alternatively, the access way 19 can serve as a distribution box with a distal end of the secondary pipeline beginning at the access way's wall.

Figure 2:
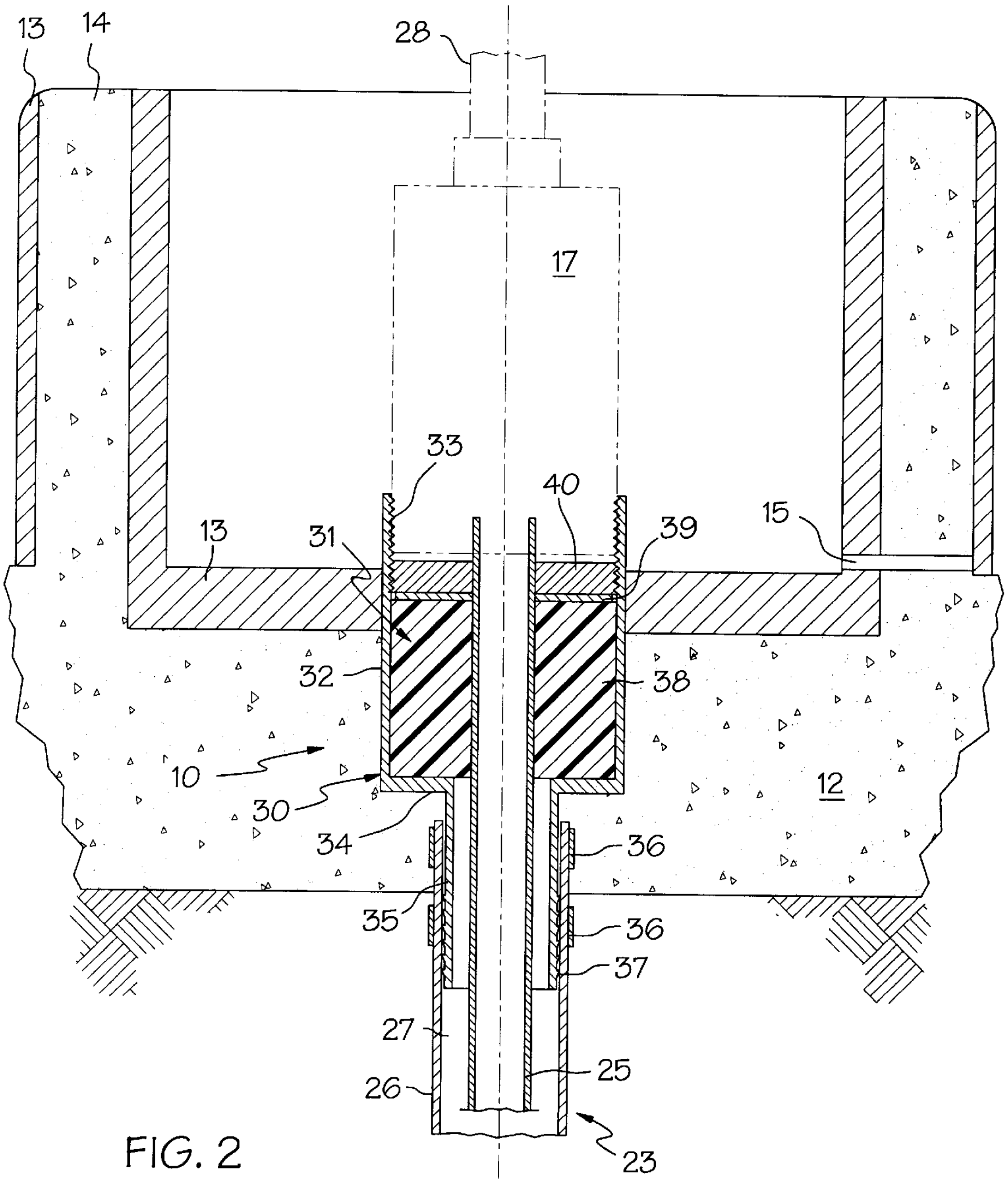
FIG. 2 is a side elevational view partially in section showing in detail the adaptor assembly of FIG. 1.

As best seen in FIG. 2, the double wall pipeline system 23 includes a primary pipeline 25 which conveys the gasoline and a larger diameter secondary pipeline 26 substantially concentric therewith. The secondary pipeline serves to contain any gasoline which may leak from the primary pipeline. An annular space 27 is formed between the primary and secondary pipelines. The primary pipeline is semi-rigid or flexible in nature and is made of any suitable material, e.g. a plastic such as polyethylene, nylon, nitrel or tetrafluoroethylene (available as Teflon) or a metal such as soft copper or aluminum or fluted stainless steel. Rolled or fluted tubing is particularly attractive in that it can be readily pulled through the secondary pipeline. Preferably, while not illustrated, a leak detection system is operably connected to the annular space between the primary and secondary pipelines to detect the presence of leaked liquid, e.g. gasoline or ground water. Any leakage detection is conveyed to a monitoring station to alert the station owner/operator to the problem. Necessarily, all terminuses of both the primary pipeline and secondary pipeline of the double wall pipeline system are sealed in a liquid-tight manner. They are sealed in a unique manner at a proximal end, i.e. at the dispenser unit base by use of the adaptor assembly 10 of the invention and are sealed in a conventional manner at a distal end, i.e. at the distribution box.

The adaptor assembly 10 of the invention is used to indirectly connect the terminus of the primary pipeline 25 to a dispenser pipeline 28 within the dispenser unit 11 and to terminate the annular space 27 between the primary and secondary pipelines. Typically, the safety shut-off valve 17 is interposed between the primary pipeline 25 and the dispenser pipeline 28. As will be evident from the description to follow, the adaptor assembly is structured to allow access to the primary pipeline and further to permit the periodic removal and replacement of the primary pipeline without disturbing in any manner the secondary pipeline and its connection to the adaptor assembly. An obvious savings in installation time and raw material usage is achieved. The primary pipeline is totally enclosed by the adaptor assembly. Further, the adaptor assembly is directly attached to the safety shut-off valve to eliminate the possibly of a fire which may occur within the base area of the dispenser unit from reaching the liquid in the primary pipeline.

Generally, as best seen in FIG. 2, the adaptor assembly includes a casing 30 and a disengageable seal system 31. The casing 30 is positioned in a preferably centered hole in a bottom wall of the rigid island form 13 and is permanently attached, e.g. by welding. A portion of the casing 30 during installation is ultimately permanently embedded in the concrete body 12. The proximal terminus of the secondary pipeline 26 of the double wall pipeline system 23 is attached in a liquid-tight manner to the casing 30. The primary pipeline 25 extends through the disengageable seal system 31 so that its terminus is located within or in communication with the safety shut-off valve 17. The disengageable seal system effectively terminates the annular space 27 between the primary pipeline 25 and the secondary pipeline 26. Any leaked liquid which may be in the annular space is contained there by the seal system 31. Additionally, any gasoline or water leakage in the dispenser unit 11 is prevented from entering the annular space 27 because of the seal system 31. Most importantly, the seal system 31 allows the primary pipeline 25 to pass through it in a liquid-tight manner and in a manner which allows access to the primary pipeline 25 for installation and replacement purposes without having to disconnect the secondary pipeline 26 from the casing 30. Further, vacuum testing or other monitoring of the annular space between pipelines can be done with the depicted test line 29. The components of the adaptor assembly 10 are described in detail in the following paragraphs.

The casing 30 of the adaptor assembly 10 has staged cylindrical-shaped members. An upper stage cylinder 32 has interior threads 33 at a top edge for receiving the externally threaded safety shut-off valve 17 and, as further described below, for receiving a ram nut forming a part of the disengageable seal system 31. The upper stage cylinder 32 further has a lower internally extending annular flange 34 which forms a seat for the seal system, also as further described below. A hole is formed by the annular flange of sufficient diameter to allow the primary pipeline 25 to pass through. A lower stage cylinder 35 extends downwardly and axially from the annular flange 34. Its outside diameter is slightly smaller than the inside diameter of the secondary pipeline 26. As shown, the secondary pipeline 26 slips over the lower stage cylinder 35 and is attached by at least one and preferably two band clamps 36. A set of barbs 37 are optionally provided on the outside surface of the lower stage cylinder 35 for enhanced pipeline attachment purposes.

While not shown, the upper and lower stage cylinders can have the same diameter. In such a case, an inwardly extending flange is provided to present a seat for the compressible annular member and in effect creates a dividing line between the cylinders.

The disengageable seal system 31 comprises a compressible annular member 38 dimensioned to fit within the upper stage cylinder 32 of the casing 30, a ram seat 39, and a ram nut 40. As will become evident from the detailed description of the individual components, the seal system 31 is readily disengaged without regard to the secondary pipeline and its connection to the casing. That is, removal of the safety shut-off valve 17 allows the ram nut 40, ram seat 39 and compressible annular member 38 to all be removed, thereby giving access to the primary pipeline 25.

The compressible annular member 38 is generally cylindrical-shaped to fit within the upper stage cylinder 32 of the casing 30 and to make sealing contact with an inside wall of the casing when a compressing force is applied. The annular member is preferably made of an elastomeric material such as nylon, tetrafluoroethylene or another synthetic polymeric elastomer. A hole extends through the annular member's approximate center to receive the primary pipeline 25. The hole is sufficiently large to allow the primary pipeline to pass when no compressive force is applied, yet small enough to seal to the primary pipeline when a compressive force is applied. The compressible annular member 38 is dimensioned to be received fully within the upper stage cylinder 32.

The ram seat 39 is basically a substantially rigid flat member with a centered hole which fits within the upper stage cylinder 32 so as to sit on top of the compressible annular member 38. The ram nut 40 has a circular shape with external threads to threadingly engage the internal threads 33 of the upper stage cylinder 32 of the casing 30. The ram nut 40 also has a centered hole to allow the primary pipeline 25 to pass through. As evident, tightening of the ram nut 40 forces the ram seat 39 downwardly and transfers a compressing force substantially evenly onto the compressible annular member 38. The compressing force causes the external and internal sidewalls of the annular compressible member 38 to expand laterally and make sealing contact with the casing 30 and the primary pipeline 25, respectively. While not necessary, a spring or spring washer can be placed between the ram nut and the ram seat to ensure maintenance of the compressing force.

For initial installation purposes, the casing 30 of the adaptor assembly 10 is positioned in the island form 13 so as to extend partially through it. A sufficient portion of the upper cylinder 32 extends above the form to allow installation of the seal system 31 and the safety shut-off valve 17. A weld or other attachment means is preferably made to hold the casing 30 to the island form 13. Next, the secondary pipeline 26 is slid over the lower cylinder 35 of the casing 30 and attached by the band clamps 36. At this point, concrete can be poured to create the concrete island structure 14, thereby forming a base comprised of the concrete body 12 and island form 13 with the casing 30 permanently attached and/or embedded therein. As should be evident, the secondary pipeline 26 is now permanently attached to the casing and the whole structure rigidly held together.

The primary pipeline is next installed. The seal system 31 is positioned by sliding the compressible annular member 38 over the primary pipeline 25 and down into the interior of the casing's upper stage cylinder 32 until it touches the annular flange 34. The ram seat 39 is slid over the primary pipeline 25 and finally the ram nut 40 slid over the primary pipeline and threaded into place until compressive forces cause sealing contact between the annular member 38 and the casing 30 and also the primary pipeline 25. The safety shut-off valve 17 is now threaded onto the threads 33 of the casing's upper stage cylinder in a liquid-tight manner and the dispenser pipeline 28 threaded onto the shut-off valve 17. Alternatively, the casing 30 can be provided with external threads on its upper stage cylinder and the safety shut-off valve 17 provided with female threads to connect them together.

Once the adaptor assembly 10 is fully installed, the annular space between the secondary pipeline and the primary pipeline is effectively sealed at the proximal terminus by the disengageable seal system 31. Any liquid leaked into the annular space 27 is prevented from escaping. Additionally, any leakage in the dispenser unit above the concrete body 12 is prevented from entering into the annular space between the pipelines. This is an important safety feature. Thus, there is no exposure of the secondary pipeline, primary pipeline, and sealing system 31 in the event of a fire in the dispenser unit. The aforementioned components under the safety valve 17 are isolated from any fire and prevents the potential for flash back through the annular space 27 to the distribution box 24 and access way 19. At the same time, the primary pipeline conveying liquid is connected into the safety shut-off valve which itself is connected to the dispenser pipeline.

Most importantly, the primary pipeline of the double wall pipeline system is accessible for removal and replacement purposes without there being a need to disturb in any manner the secondary pipeline's attachment to the casing. The safety shut-off valve is removed, thereby exposing the disengageable seal system 31 operably associated with the casing 30. The seal system in turn is removed by unthreading the ram nut and pulling out the ram seat and compressible annular member. The primary pipeline's proximal end is now freed and can be pulled away from its associated secondary pipeline after disconnecting the primary pipeline's distal end. A new primary pipeline is simply snaked or pulled through the secondary pipeline, connected at its distal end, and the seal system again reassembled and engaged within the casing.

Figure 3:
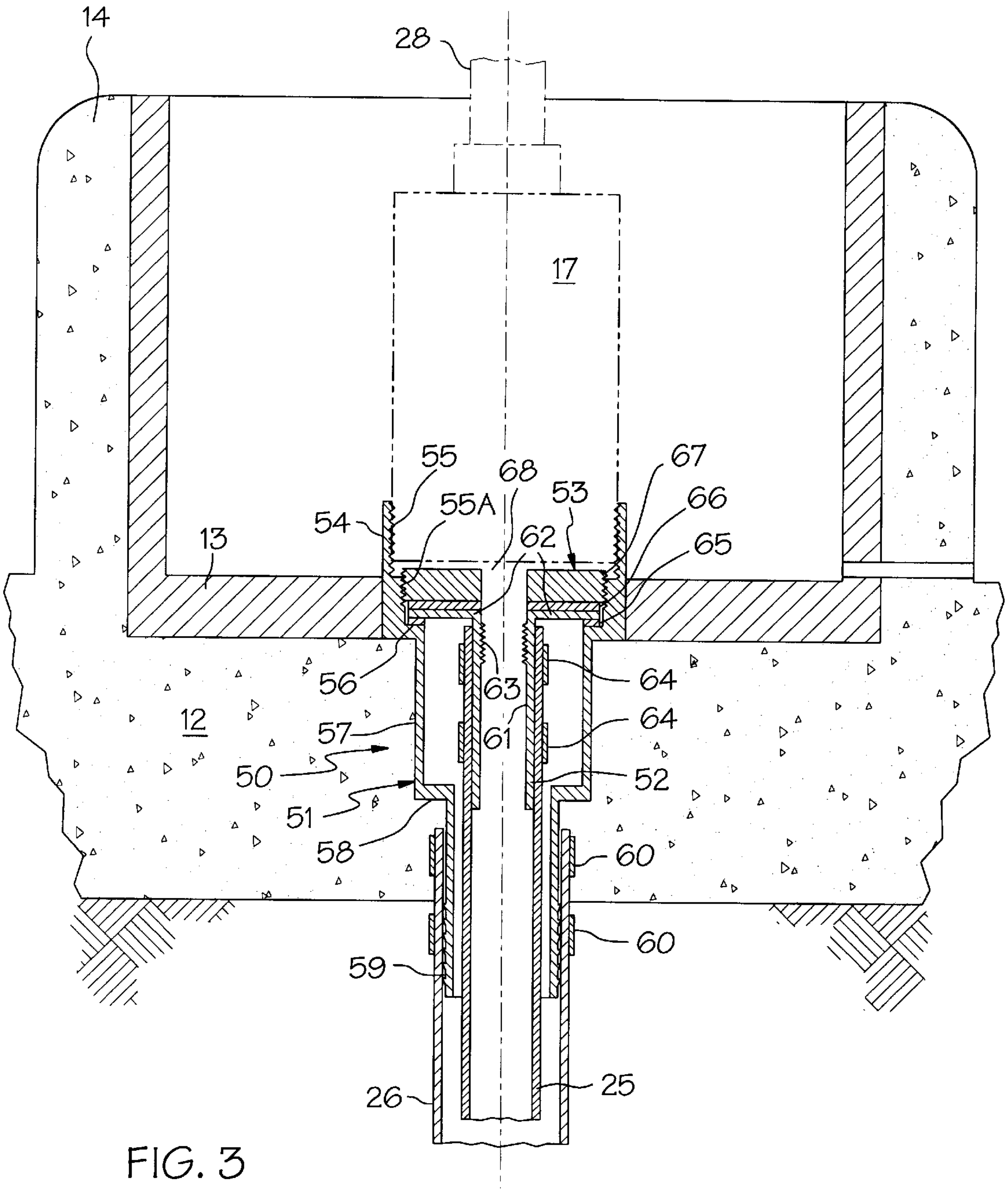
FIG. 3 is a side elevational view partially in section of an adaptor assembly of the invention utilizing a one-piece casing, disengageable seal system and a flanged coupling.

Another adaptor assembly of the invention is depicted in FIG. 3. The adaptor assembly 50 includes a casing 51 attached to a terminus of the secondary pipeline 26 and a coupling 52 attached to a terminus of the primary pipeline 25 and at least partially within the casing 51. A disengageable seal system 53 terminates the annular space between the primary pipeline 25 and secondary pipeline 26 in a liquid-tight manner.

The casing 51 depicted in FIG. 3 is a one-piece member. It is adapted for rigid mounting in the concrete body 12 and preferably the island form 13 under the dispenser unit 11 in a permanent manner. The casing is made of staged cylindrical-shaped members. An upper stage cylinder 54 secured to the island form 13, e.g. by welding, has a length sufficient to extend above a floor of the base of the dispenser unit. It has a first set of internal threads 55 at a top edge to receive the externally threaded safety valve 17. A second set of internal threads 55A is inwardly offset from the first set of internal threads. The second set of threads 55A is used to receive a ram nut, forming part of the disengageable seal system, as further described below. An annular flange 56 extending inwardly from a lower edge of the upper stage cylinder 54 forms a shoulder. Extending axially from an inner edge of the flange 56 is a middle stage cylinder 57. The middle stage cylinder has a smaller diameter than the upper stage cylinder and is intended to create a space sufficiently large to accommodate the coupling 52 and attachment means used to attach it to the primary pipeline 25. An annular flange 58 extending inwardly from a lower edge of the middle stage cylinder 57 has a lower stage cylinder 59 extending axially from it. The lower stage cylinder 59 has a diameter sufficiently large to accommodate the primary pipeline 25 within it. It can be smaller in diameter than that of the upper stage cylinder 54 as shown, the same or larger. Attachment means, e.g. band clamps 60 are used to hold the secondary pipeline 26 to the lower stage cylinder 59 of the casing 51. Other attachment means used to form a liquid-tight seal between concentric tubular members can be used, e.g. O-rings, adhesives, sealants and heat shrinking materials. Alternatively, the retainer member 99 can be sealed liquid-tight to the coupling 92 so that the O-rings are used only on the retainer member's outer surface adjacent the casing 91.

The adaptor assembly 50 also includes the coupling 52. It is attached in a liquid-tight fashion to a terminus of the primary pipeline. The coupling has a tubular body 61 which is dimensioned to fit within the primary pipeline 25 and further has an annular flange 62 extending outwardly from an upper edge of the tubular body. A diameter of the annular flange 62 is sized to extend outwardly sufficiently to sit on the shoulder formed by the inwardly extending flange 56 of the casing 51. The coupling 52 preferably includes a set of internal threads 63. The threads aid in removing the primary pipeline 25 from the double wall pipeline system 23 as further described below with reference to FIG. 5 in the operation of the adaptor assembly of the invention.

An example of suitable attachment means to hold the primary pipeline 25 to the coupling 52 is a set of band clamps 64. Other attachments means as described above with respect to attaching the casing to the secondary pipeline are usable here as well.

The coupling's annular flange 62 together with an underlying gasket 65, an overlying gasket 66 and a ram nut 67 form the liquid-tight disengageable seal system 53. As with the seal system 31 of FIG. 2, the seal system 53 terminates the annular space 27 between the primary and secondary pipelines to prevent flow of leaked liquid therefrom. The gaskets 65 and 66 are conventional. The ram nut 67 has external threads to engage the threads 55A of the casing. A central hole 68 in the ram nut 67 allows the flow of gasoline from the primary pipeline through the safety shut-off valve 17 into the dispenser pipeline 28. While not evident in the drawing, the central hole 68 is preferably hexagonally-shaped or square-shaped to better receive a wrench for ease of ram nut installation and removal.

As should be evident, the casing 51 of the adaptor assembly 50 is permanently attached to the base of the dispenser unit 11, i.e. the optional island form 13 and concrete body 12 so as to permanently hold the secondary pipeline 26 in a secured liquid-tight manner. The concrete body at least partially encases the casing 51 of the adaptor assembly 50. In a similar manner as discussed further below with reference to FIGS. 10 and 11, it is also feasible to set the casing 51 directly into the concrete body 12 without the island form 13.

In accord with this invention, the disengageable seal system 53 provides access to the primary pipeline 25 within the casing 51 of the adaptor assembly 50 without disturbing the seal between the casing 51 and the secondary pipeline 26. The ram nut 67 is simply unthreaded. This frees the gaskets 65 and 66 and also the flange 62 of the coupling 52 from engagement with the casing 51. A distal end of the primary pipeline 25, located e.g. within the distribution box 24 is loosened. Then, an upward manual force pulls the coupling 52 with attached primary pipeline 25 from the casing 51 without the secondary pipeline 26 having to be disconnected or disturbed in any other manner. The internal threads 63 in the coupling 52 can be used for gripping purposes, when a specially designed tool illustrated in FIG. 5 and further described below is used. If desired, the primary pipeline 25 can be removed by pulling at the distal end after making the necessary disconnections.

Figure 4:
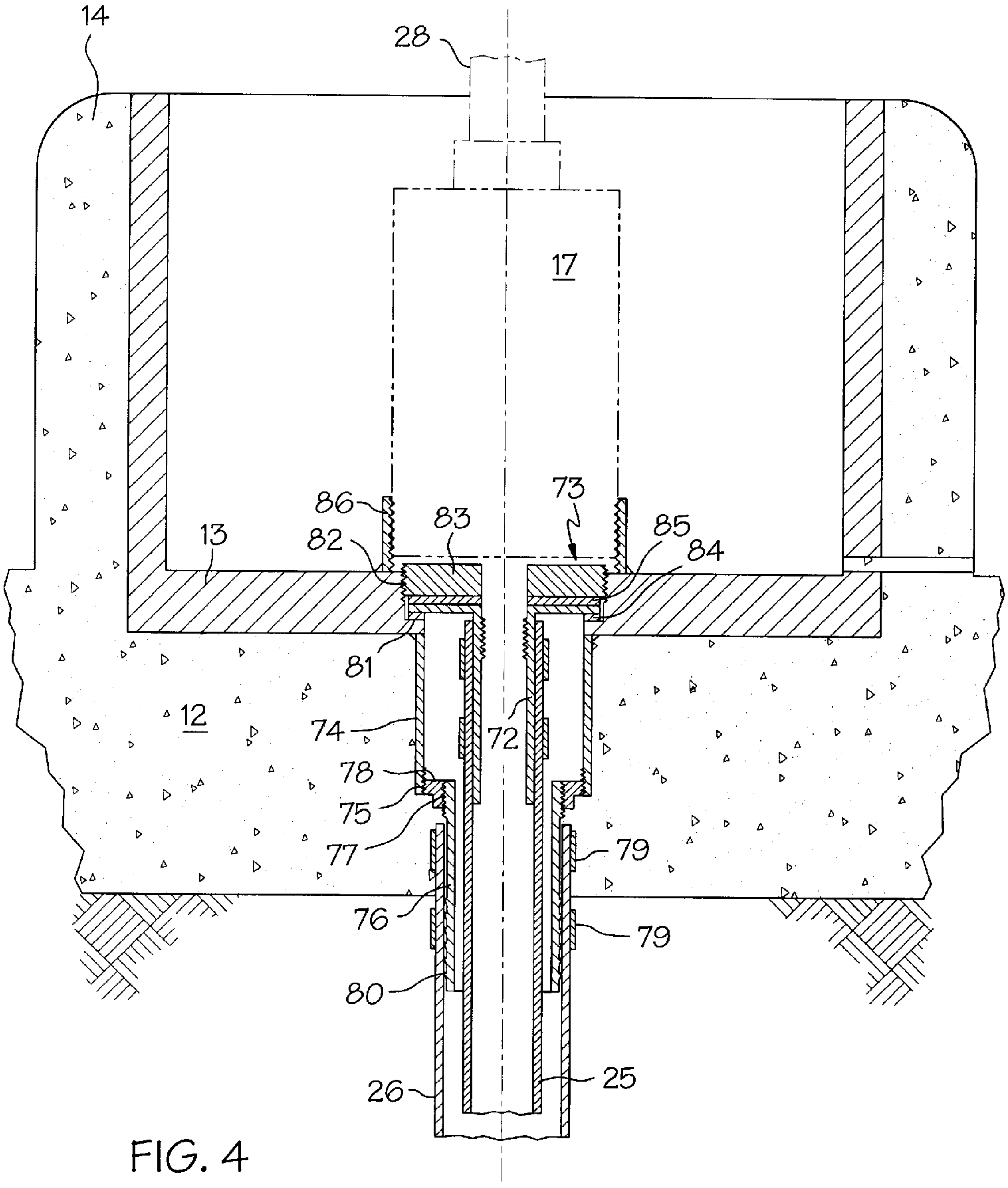
FIG. 4 is a side elevational view partially in section of an adaptor assembly of the invention showing a three-piece casing, disengageable seal system and a flanged coupling.
Figure 5:
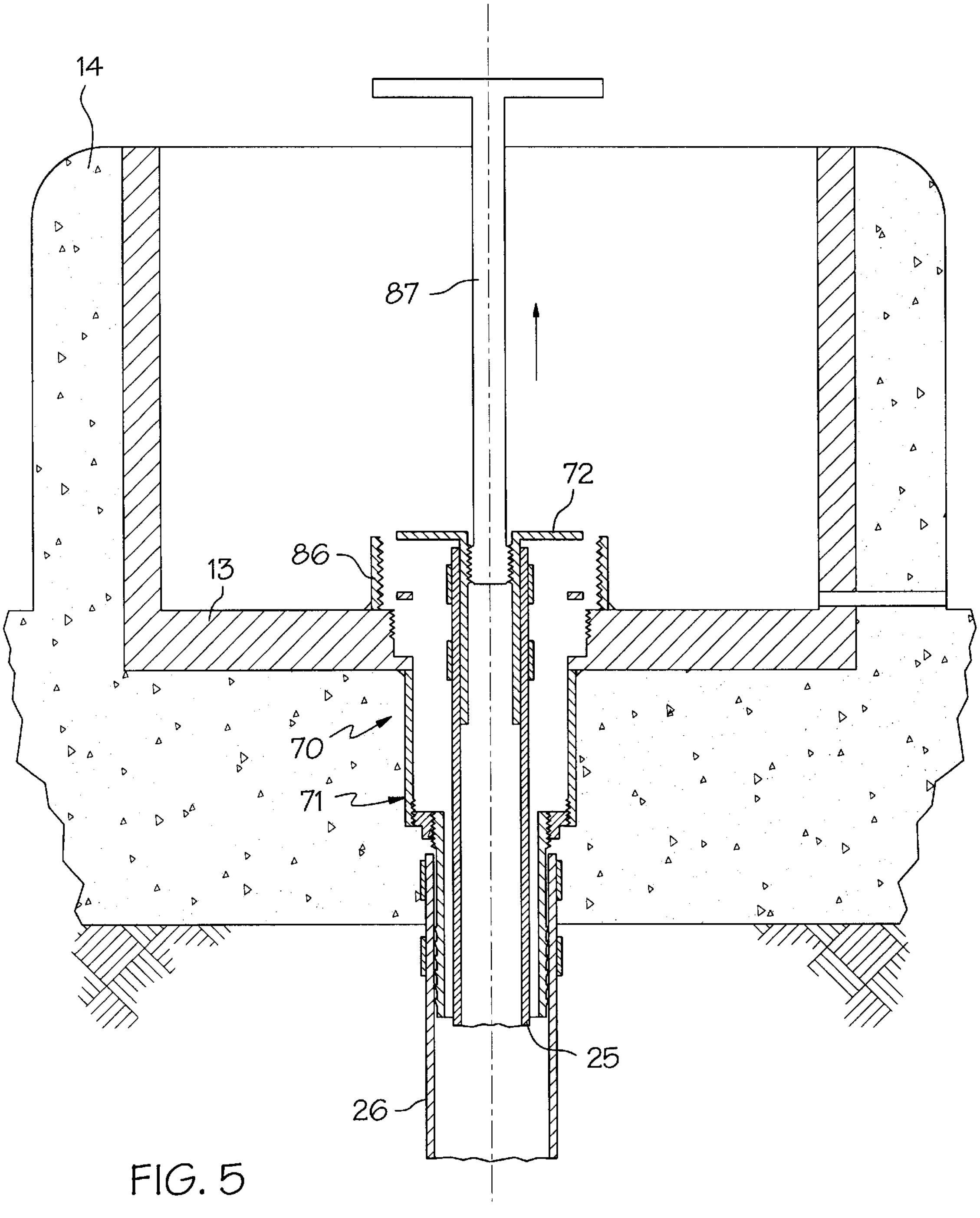
FIG. 5 is a side elevational view partially in section of the adaptor assembly of FIG. 4 showing a primary pipeline in the process of being removed from a double wall pipeline system.

Another adaptor assembly depicted in FIGS. 4 and 5 is similar in design and operation to the adaptor assembly 50 of FIG. 3. FIG. 4 depicts the adaptor assembly 70 in position in a dispenser unit base. FIG. 5 depicts the adaptor assembly 70 partially disengaged with a primary pipeline and further the primary pipeline is in the process of being removed from the double wall pipeline system.

The assembly 70 of FIG. 4 comprises a casing 71 attached to a terminus of the secondary pipeline 26 and a coupling 72 attached to a terminus of the primary pipeline 25. A disengageable seal system 73 terminates the double wall pipeline system's annular space 27 in a liquid-tight fashion. As described below, the casing 71 is a three-piece member. The three-piece member has replaceable parts and is preferred for this reason over the one-piece casing 51 of the adaptor assembly 50 described above. Further, as described below, the dispenser unit base must be specially machined to accommodate the assembly's removable seal system 73. The coupling 72 and the disengageable seal system 73 are each the same as the coupling 52 and the disengageable seal system 53 of the adaptor assembly 50 described above with reference to FIG. 3.

As evident in FIG. 4, the casing 71 of the adaptor assembly 70 has an upper cylinder 74 for attachment by welding or other suitable means to the island form 13 of the dispenser unit base. A set of lower internal threads 75 are provided at a bottom edge of the upper cylinder. A lower cylinder 76 of preferably smaller diameter than the upper cylinder 74 has a set of upper external threads 77 at a top edge. An internally and externally threaded bushing 78 is dimensioned to connect together the upper and lower cylinders 74 and 76, respectively. The lower cylinder 76 provides a rigid backing for aiding in attaching the secondary pipeline 26 by at least one and preferably two band clamps 79. While optional, external barbs 80 are provided in the lower cylinder's lower external surface to better receive and hold the secondary pipeline 26.

The island form 13 which is a part of the base of the dispenser unit is configured to accommodate the adaptor assembly 70. Thus, a hole extending vertically through the island form 13 has a shoulder 81 provided to receive the disengageable seal system 73 and coupling 72 attached to it. Additionally, internal threads 82 are provided in the hole to engage threads on a ram nut 83 of the seal system 73. An underlying gasket 84 and an overlying gasket 85 are a part of the seal system. An upwardly extending and internally threaded fitting 86 is permanently secured to the island form 13 so as to encompass the hole and to receive a safety shut-off valve 17 (shown in phantom).

The adaptor assembly 70 is readily assembled in the field. As evident, once the casing 71 is attached to the form and the secondary pipeline is attached, concrete is poured to form the concrete body 12 and concrete island structure 14. This effectively encases the casing of the adaptor assembly permanently in concrete. As with the adaptor assembly 50 of FIG. 3, the disengageable seal system 73 is readily installed and subsequently disengaged when needed to periodically remove and replace the primary pipeline.

FIG. 5 illustrates the adaptor assembly 70 partially disengaged and the primary pipeline 25 pulled partially out of the secondary pipeline 26 of the double wall pipeline system 23. The ram nut 83 and the gasket 85 directly under it as seen in FIG. 4 have been removed. This frees the coupling 72. A specially designed tool 87 comprising a shaft with a handle at one end and a threaded head at another end is placed inside the coupling 72 and threaded onto the coupling's internal threads. After disconnecting a distal end of the primary pipeline, an upwardly directed force pulls the primary pipeline 25 with the coupling 72 still attached out of the secondary pipeline 26. A manual or mechanical force can be applied. As readily apparent, the casing 71 and its attached secondary pipeline 26 need not be disconnected.

Figure 6:
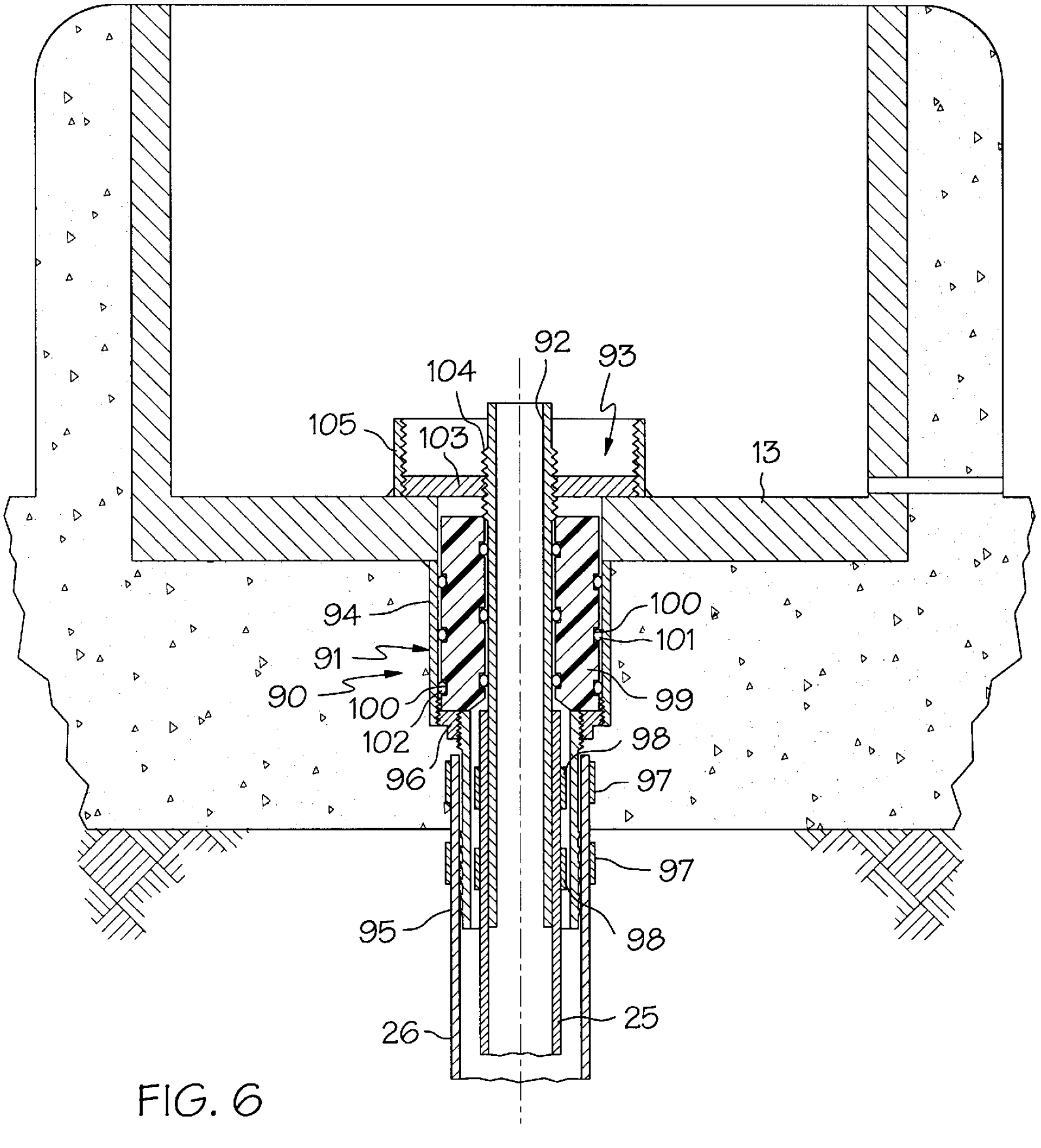
FIG. 6 is a side elevational view partially in section showing another adaptor assembly of the invention using an O-ring annular retainer member and O-rings as part of a disengageable seal system.

With reference to FIG. 6, there is shown another adaptor assembly 90 of the invention which has a different disengageable seal system to terminate the annular space 27 formed by the primary pipeline 25 and the secondary pipeline 26. The assembly comprises a casing 91, a coupling 92 and a disengageable seal system 93.

The casing 91 is similar in structure to the casing 71 of FIG. 4. It comprises an upper cylinder 94, lower cylinder 95 and bushing 96 connecting the two cylinders together. The secondary pipeline 26 of the double wall pipeline 23 is attached by band clamps 97 to the lower cylinder 95 of the casing 91. While, as shown, the lower cylinder 95 is smaller in diameter than the upper cylinder 94, it could as well be larger in diameter.

The coupling 92 is a tubular member dimensioned to fit within the terminal end of the primary pipeline 25 and be attached by band clamps 98 or some other attachment means in a liquid-tight manner. The point of attachment is at a lower end of the coupling and is preferably made within the lower cylinder 95 of the casing 91.

The disengageable seal system 93 fits within the upper cylinder 94 of the casing 91. It includes an O-ring annular retainer member 99 which preferably sits on the bushing 96 and fits at least partially into the upper cylinder so as to substantially fill the space within the upper cylinder 94. O-ring grooves 100 are provided in inner and outer wall surfaces of the retainer member 99. O-rings 101 in the inner wall surface grooves make sealing contact with the coupling 92 and O-rings 102 in the outer wall surface grooves make sealing contact with the inner surface of the casing's upper cylinder 94. In effect, the retainer member 99 and the O-rings 101 and 102 terminate the annular space 27 between the primary and secondary pipelines to prevent the further flow of any leaked liquid.

A retention nut 103 is optionally provided for enhanced seal retention of the O-ring annular retainer member 99. In this embodiment, the coupling 92 is provided with upper external threads 104. The retention nut 103 is threaded onto the external threads 104 of the coupling 92 until it preferably engages a top surface of the retainer member 99. A vertically extending and internally threaded fitting 105 is ideally mounted on the island form 13 to receive a safety shut-off valve (not shown) and further to receive the retention nut 103. The installation of the adaptor assembly 90 to a dispenser unit base is similar to that described above with respect to the adaptor assembly of FIG. 2. For primary pipeline removal and replacement purposes, the disengageable seal system 93 is readily disengaged to access the primary pipeline 25. Here too, the disengagement of the seal system is similar in operation to that described above.

Figure 7:
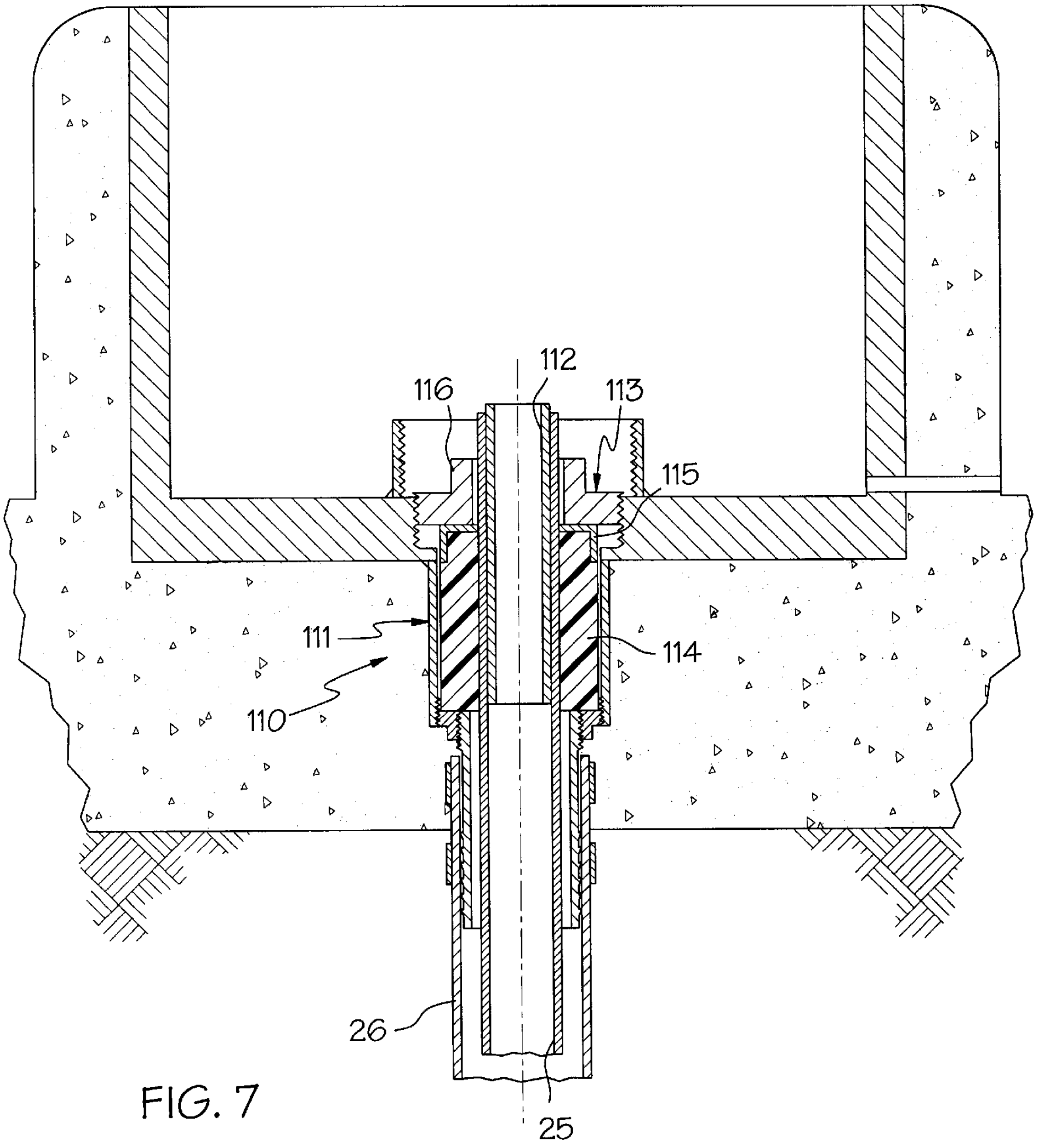
FIG. 7 is a side elevational view partially in section showing an adaptor assembly with a disengageable seal system having enhanced primary pipeline creep resistance resulting from use of a compressible annular member and a threaded ram nut.

Still another adaptor assembly 110 of the invention is shown in FIG. 7. The assembly depicted is preferably used with a flexible metal primary pipeline, e.g. copper or aluminum tubing. The assembly 110 comprises a casing 111, a coupling 112 and a disengageable seal system 113. The casing 111 is similar in construction to the casing 91 of the adaptor assembly 90 of FIG. 6. The coupling 112 is a short tubular member which fits into a terminal end of the primary pipeline 25. A flared end is preferably provided for ease of installation purposes. The coupling 112 primarily acts as a rigid backing to prevent collapse of the primary pipeline's terminus. The disengageable seal system 113 includes a compressible annular member 114 which provides a compression seal on both its inner wall surface which is in contact with the primary pipeline 25 and on its outer wall surface which is in contact with the casing 111. Enhanced crush resistance of the primary pipeline is experienced with this seal system. The annular member 114 is made of a compressible material, e.g. a synthetic elastomeric material and is dimensioned to fit at least partially into the upper cylinder and to substantially fill the space within the upper cylinder of the casing 111. An annular ram seat bonnet 115 fits over the coupling 112 and primary pipeline 25 and sits on top of the compressible annular member 114. The bonnet has an annular flat member with a downwardly extending peripheral rim. A ram nut 116 is externally threaded to engage threads in a hole in the island form 13 and to impart a force onto the ram seat bonnet 115 to hold the annular member 114 in place during use. While not necessary, the ram seat bonnet 115 prevents the annular member 114 from spreading out and is preferably used for this reason. Further, the ram nut 116 can be tightened until it abuts the shoulder 117 to provide a predetermined down force.

Figure 8:
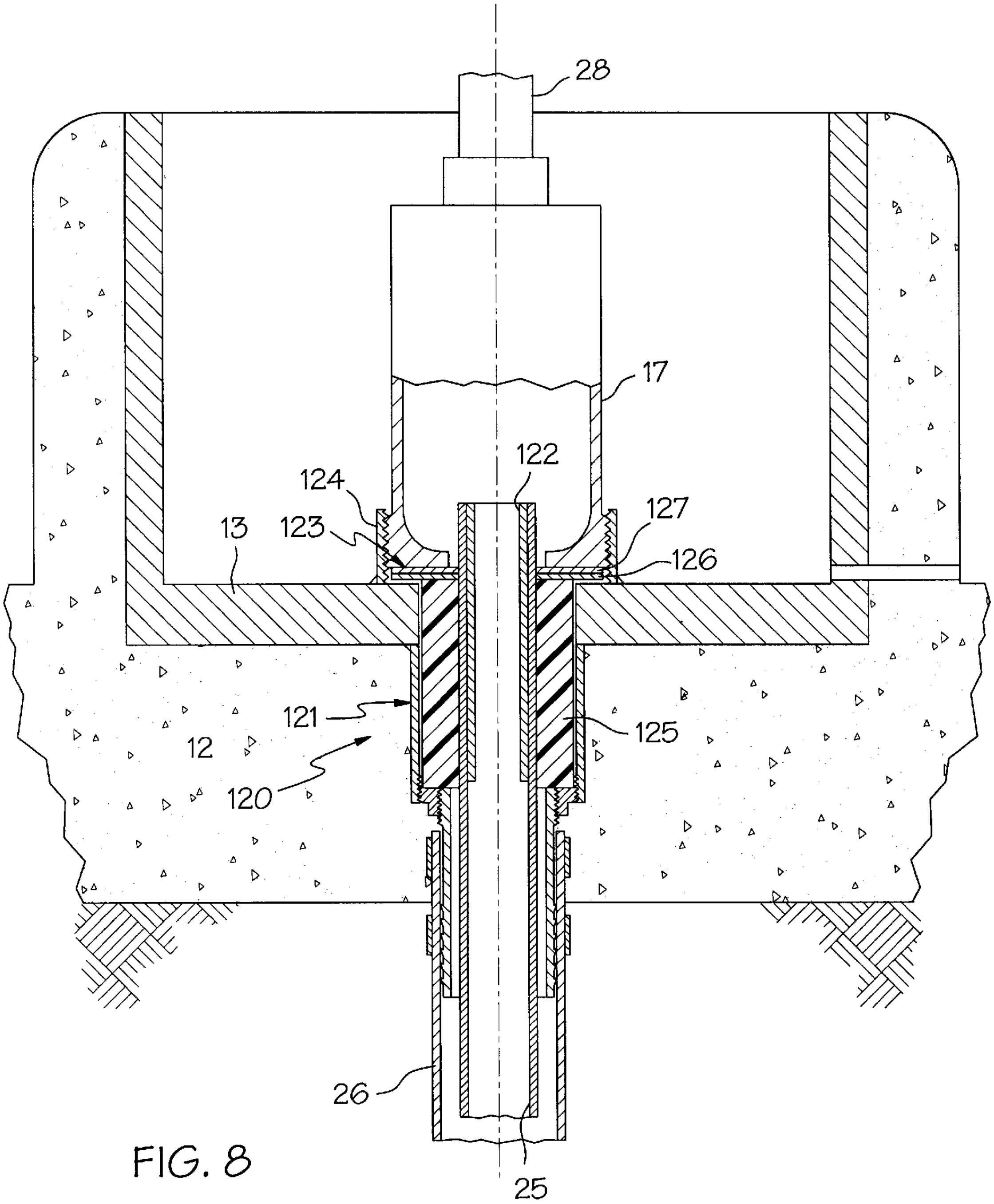
FIG. 8 is a side elevational view partially in section showing an adaptor assembly with a disengageable seal system having a compressible annular member for enhanced primary pipeline creep resistance and further wherein a shut-off safety valve provides a compressing force for sealing purposes.

FIG. 8 illustrates an adaptor assembly 120 wherein the safety shut-off valve 17 acts as a ram nut to hold a disengageable seal system in place. The assembly comprises a casing 121, a coupling 122 and a disengageable seal system 123. A substantially rigid form 13, preferably of metal, on which a dispenser unit (not shown) is mounted is provided with a vertically extending hole to accommodate the adaptor assembly 120. An annular internally threaded fitting 124 is attached to the top surface of the island form 13 and extends upwardly. The fitting 124 encircles the hole and is dimensioned to receive the shut-off valve 17.

The casing 121 of the adaptor assembly is similar in construction to the casing 91 of the adaptor assembly 90 depicted in FIG. 6. The coupling 122 is the same as the coupling 112 of the adaptor assembly 110 depicted in FIG. 7. In accord with this embodiment of the invention, the disengageable seal system 123 comprises a compressible annular member 125 which fits into the upper cylinder of the casing 121 and extends into the hole in the island form 13 to slightly above the approximate base surface level. An annular ram seat 126 fits over the primary pipeline 25 and the coupling 122 to rest on the top surface area of the compressible annular member 125. Preferably, the ram seat 126 is in the form of a bonnet similar to the ram seat bonnet 115 of FIG. 7. In a preferred ram seat, a rim portion slides partially down into the casing 121 to help contain annular member 125 compression forces. A gasket 127 fits over the ram seat 126. The safety shut-off valve 17 when threaded into the annular threaded fitting 124 creates a compressive force on the compressible annular member 125 to seal the annular space 27 between the primary pipeline 25 and the secondary pipeline 26 in a liquid-tight manner. The bottom of the safety shut-off valve 17 acts as the described ram nut in previous figures.

A benefit of the adaptor assembly 120 is its ease of use in removal and reinstallation of the primary pipeline 25. Removal of the safety shut-off valve 17 fully exposes the primary pipeline to permit a simple pulling action to free it from the secondary pipeline 26 of the double wall pipeline system 23.

Figure 9:
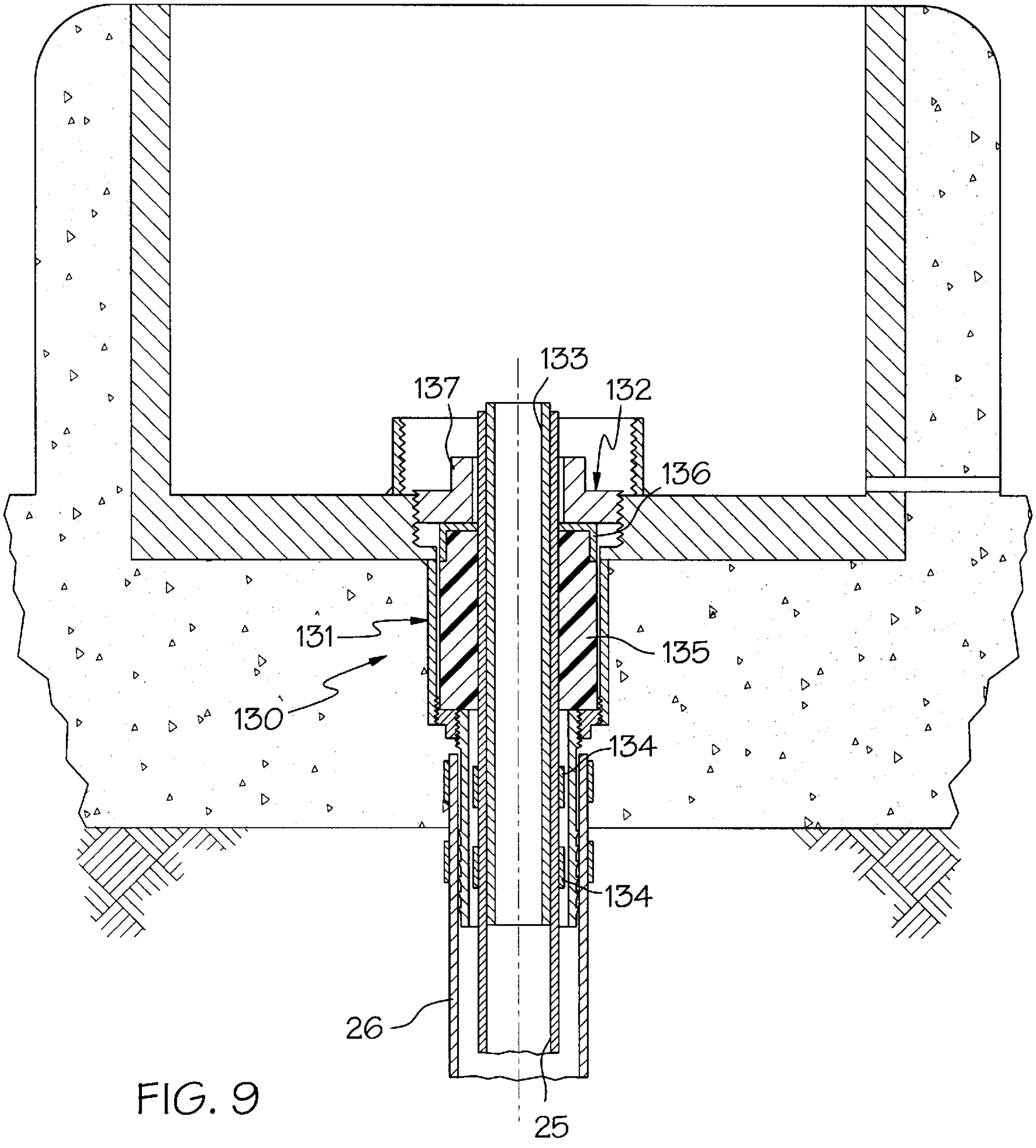
FIG. 9 is a side elevational view partially in section showing an adaptor assembly with a disengageable sealing system having a compressible annular member for enhanced primary pipeline creep resistance and an elongated coupling band-clamped to a primary pipeline for enhanced primary pipeline crush resistance.

FIG. 9 illustrates an adaptor assembly 130 similar in construction to the adaptor assembly 110 of FIG. 7. However, a different attachment means is used to hold the primary pipeline to a coupling. The assembly 130 comprises a casing 131 and a disengageable seal system 132 the same as described above and illustrated in FIG. 7. The coupling 133, though, extends from the safety shut-off valve 17 into a lower cylinder of the casing 131. A set of band clamps 134 attaches in a liquid-tight fashion the primary pipeline 25 to the coupling 133. The balance of the assembly including a compressible annular member 135, ram seat bonnet 136 and ram nut 137 are the same in construction and operation as the corresponding elements described above with reference to FIG. 7.

Figure 10:
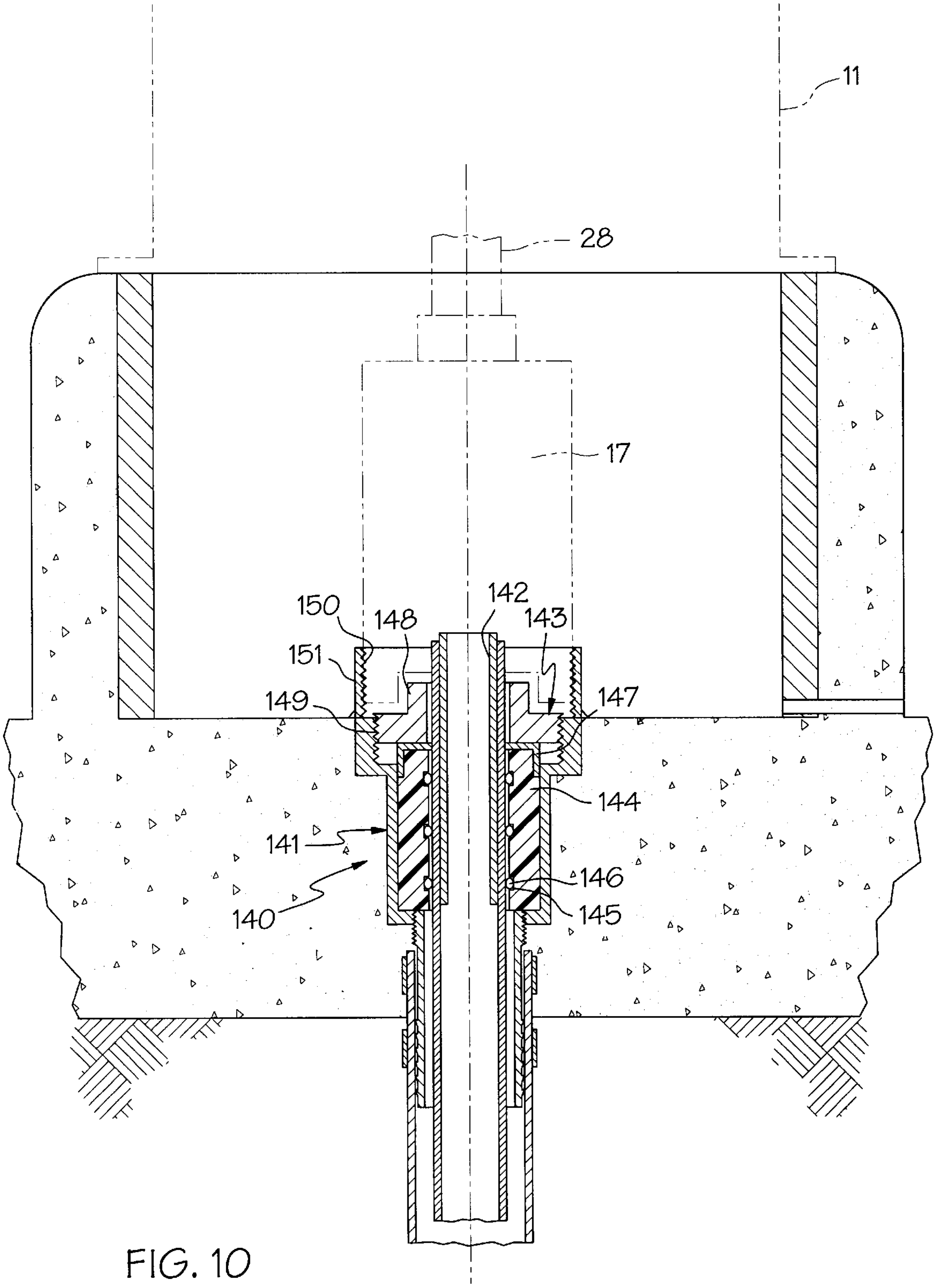
FIG. 10 is a side elevational view partially in section showing an adaptor assembly similar in construction to the adaptor assembly of FIG. 7 and further which is embedded directly in a concrete base.
Figure 11:
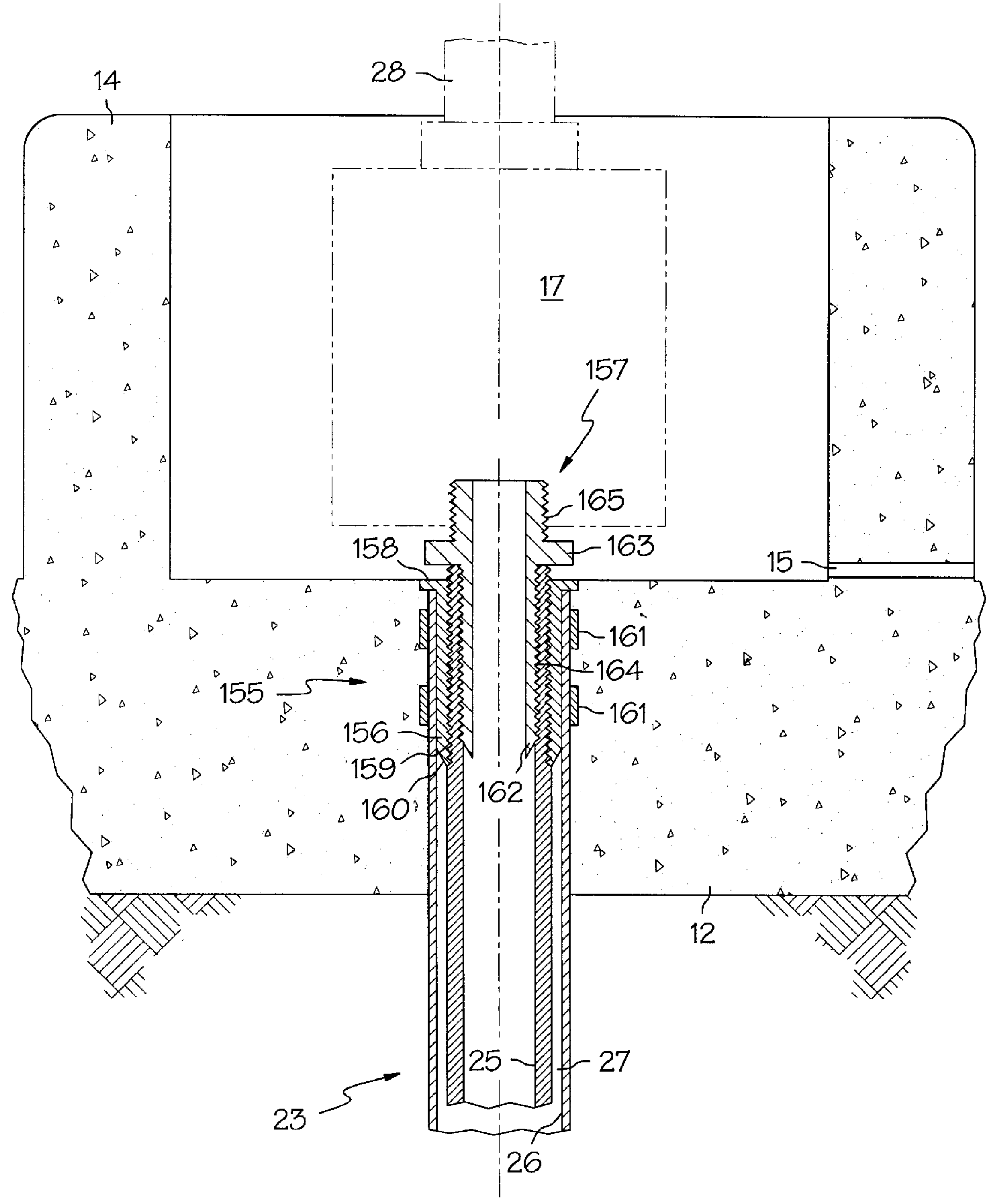
FIG. 11 is a side elevational view partially in section showing a two-piece adaptor assembly of the invention having a casing and a disengageable seal system which also serves as a coupling for a primary pipeline.

FIGS. 10 and 11 depict adaptor assemblies which are set in concrete underneath the dispenser unit. Such installations are more labor intensive in the field, but do provide reliability benefits.

As a preferred embodiment of the invention, the adaptor assembly 140 of FIG. 10 is similar to the adaptor assembly 110 depicted in FIG. 7. However, its casing is set directly in concrete. The adaptor assembly 140 has a casing 141 for attachment to the secondary pipeline 26, a coupling 142 as a backing for the primary pipeline 25, and a disengageable seal system 143. The casing 141 and the coupling 142 are substantially the same in structure to the casing 51 described with reference to FIG. 3 and the coupling 112 described above with reference to FIG. 7.

The disengageable seal system 143 of the adaptor assembly 140 for terminating the annular space 27 between the primary pipeline 25 and the secondary pipeline 26 includes a compressible annular member 144 dimensioned to substantially fit into an upper cylinder of the casing 141. Interior O-ring grooves 145 and associated O-rings 146 ensure a liquid-tight fit with the primary pipeline. The disengageable seal system also includes a ram seat bonnet 147 and a ram nut 148. The ram seat bonnet 147 is made of a rigid material, e.g. metal and sits on top of the annular member 144 with a peripheral rim extending down and along the upper cylinder's inner wall surface. Its purpose is to receive a compressing force from the ram nut 148 and transmit it to the annular member 144. It also prevents the upper portion of the annular member 144 from spreading beyond the area within the upper cylinder of the casing 141. The ram nut 148 is externally threaded and dimensioned to engage threads 149 on an upper cylinder of the casing 141.

The safety shut-off valve 17 is also accommodated by the casing 141 of the adaptor assembly. A set of internal threads 150 on an upwardly extending annular flange 151 of the casing receives the shut-off valve.

FIG. 11 illustrates a two-piece adaptor assembly which meets the objectives of the invention. The adaptor assembly 155 comprises a casing 156 and a disengageable seal system 157. The assembly as depicted is set directly in a concrete base. Its minimum of components renders it particularly easy to install, remove and replace a primary pipeline. In this embodiment, the primary pipeline 25 is preferably made of a soft plastic.

The casing 156 of the adaptor assembly 155 is a straight tubular member, preferably with an outwardly extending flange 158. It has a set of internal threads 159 and preferably a tapered lower end 160. The outside diameter of the casing 156 is slightly smaller than the inside diameter of the secondary pipeline 26. A secure liquid-tight attachment of the casing 156 to the secondary pipeline 26 is ensured by a set of band clamps 161.

The casing 156 contributes to terminating the annular space 27 between the primary pipeline 25 and the secondary pipeline 26. Further sealing is provided by the disengageable seal system 157. The seal system includes a tapered tubular body 162 with preferably an annular flange 163 extending outwardly in an upper to mid-portion and lower external threads 164 in a lower section and upper external threads 165 in an upper section. The tapered tubular body 162 is dimensioned to screw inside the primary pipeline 25 and be held to it in a liquid-tight manner. This occurs by the tapered tubular body 162 expanding the primary pipeline 25 against the casing 156. In installation, the tubular body 162 is screwed into the soft primary pipeline 25 in a self-tapping fashion. The annular flange 163 is preferably hexagonal-shaped to accommodate a wrench during engagement and disengagement steps. The upper set of external threads 165 is to receive the safety shut-off valve 17.

The disengageable seal system 157 serves to form a liquid-tight connection between the primary pipeline 25 and the safety shut-off valve 17. It also contributes to terminating the annular space 27 between the primary and secondary pipelines in a liquid-tight manner.

The adaptor assembly 155 allows the primary pipeline 25 to be readily removed and replaced. The tubular body 162 of the disengageable seal system 157 is simply unscrewed and removed. Ideally, the primary pipeline is removed by disconnecting its distal end and pulling the primary pipeline back through the secondary pipeline 26.

Figure 12:
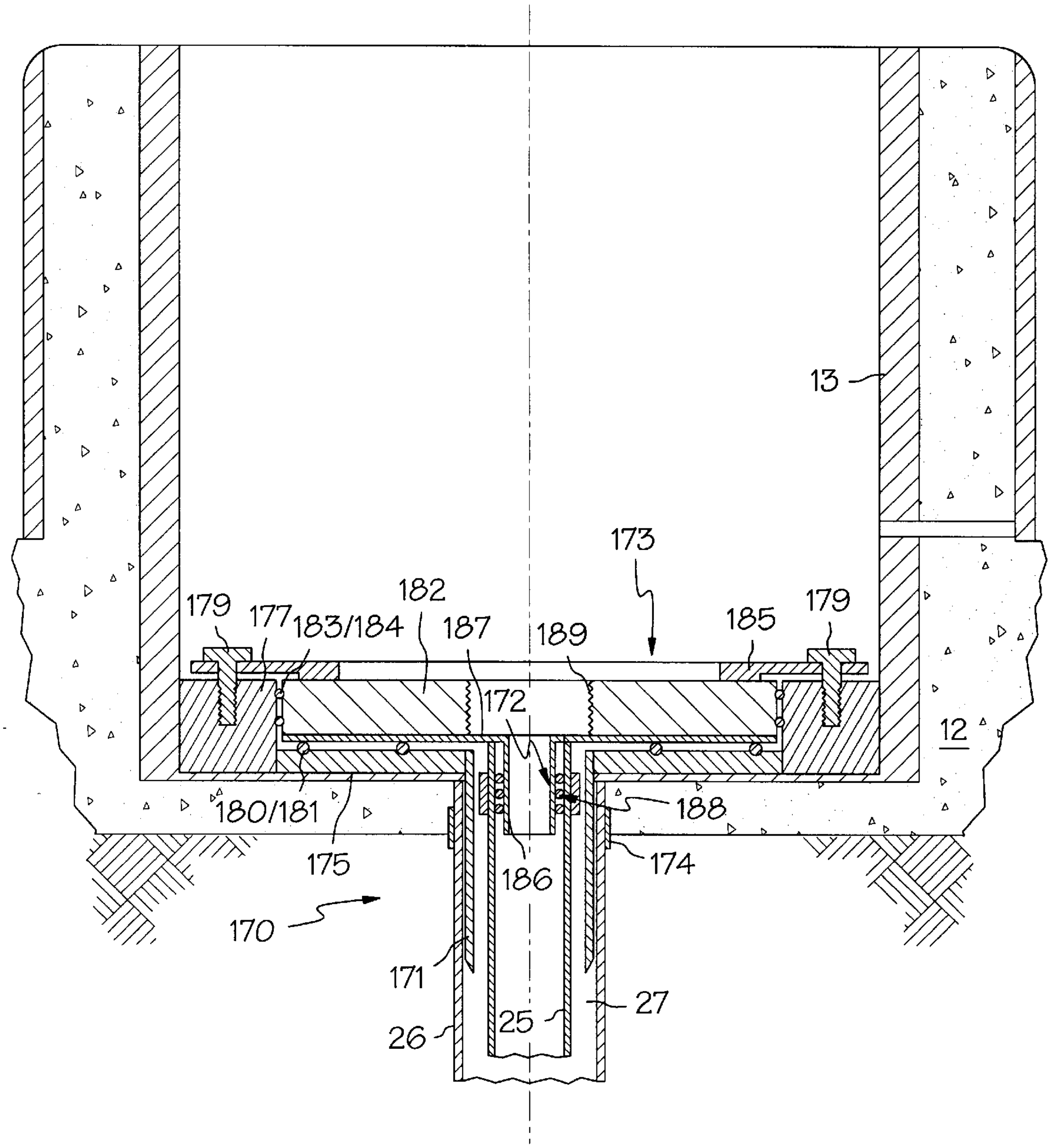
FIG. 12 is a side elevational view partially in section showing an adaptor assembly of the invention comprising a casing and a disengageable seal system wherein a flanged coupling and a bolted ram seat system provides sealing.

FIG. 12 illustrates still another adaptor assembly 170 of the invention. This assembly provides an added convenience in accessing the primary pipeline 25 and removing it for replacement purposes. The assembly comprises a casing 171 attached to the secondary pipeline 26, a coupling 172 attached to the primary pipeline 25 and a disengageable seal system 173.

The casing 171 of the adaptor assembly 170 is a rigid tubular member which is dimensioned to snugly fit within the secondary pipeline 26. Band clamps 174 are used to hold the secondary pipeline 26 to the casing 171, though other conventional attachment means can be used. For example, a threaded connection can be made. The casing 171 itself is permanently attached to a rigid flat base plate 175. The base plate 175 has a hole extending through it to accommodate the pipelines and adaptor assembly. An anchor member 177 is permanently mounted in the well of the island form 13 and is used to accommodate components of the disengageable seal system 173. The anchor member 177 has vertical holes to receive a set of bolts 179. The bolts are used to hold together the sealing system of the adaptor assembly. It is preferred that the flat base 175 has at least one O-ring groove 180 in an upper surface and associated O-rings 181. A ram seat 182, forming a part of the disengageable seal system 173 fits into the recess. O-ring grooves 183 in a side wall of the ram seat and O-rings 184 positioned in the grooves 183 provide added sealing. Gasket sealing can also be used as well as other known sealing methods. A hold-down plate 185 overlies the ram seat 182. Holes in its periphery are in alignment with the bolts 179.

The coupling 172 is a tubular member 186. An upper flange 187 that extends outwardly from an upper edge is another part of the disengageable seal system 173. The flange 187 has a diameter which approximates the diameter of the recess. O-rings 188 can be positioned on the outside wall of the tubular member 186 to contact the primary pipeline 25 for enhanced liquid-tight sealing purposes. Threads 189 are preferably provided in a central hole found in the ram seat 182 to receive the safety shut-off valve (not shown).

In use, the primary pipeline is accessed by removing the bolts 179. This allows the hold-down plate 185, ram seat 182 and coupling 172 with primary pipeline 25 attached to all be lifted up (after disconnecting the distal end of the primary pipeline). Removal of the primary pipeline from the coupling is readily accomplished as is its removal from within the secondary pipeline 26. Replacing the primary pipeline with another one is readily accomplished by merely reversing the above steps.

Figure 13:
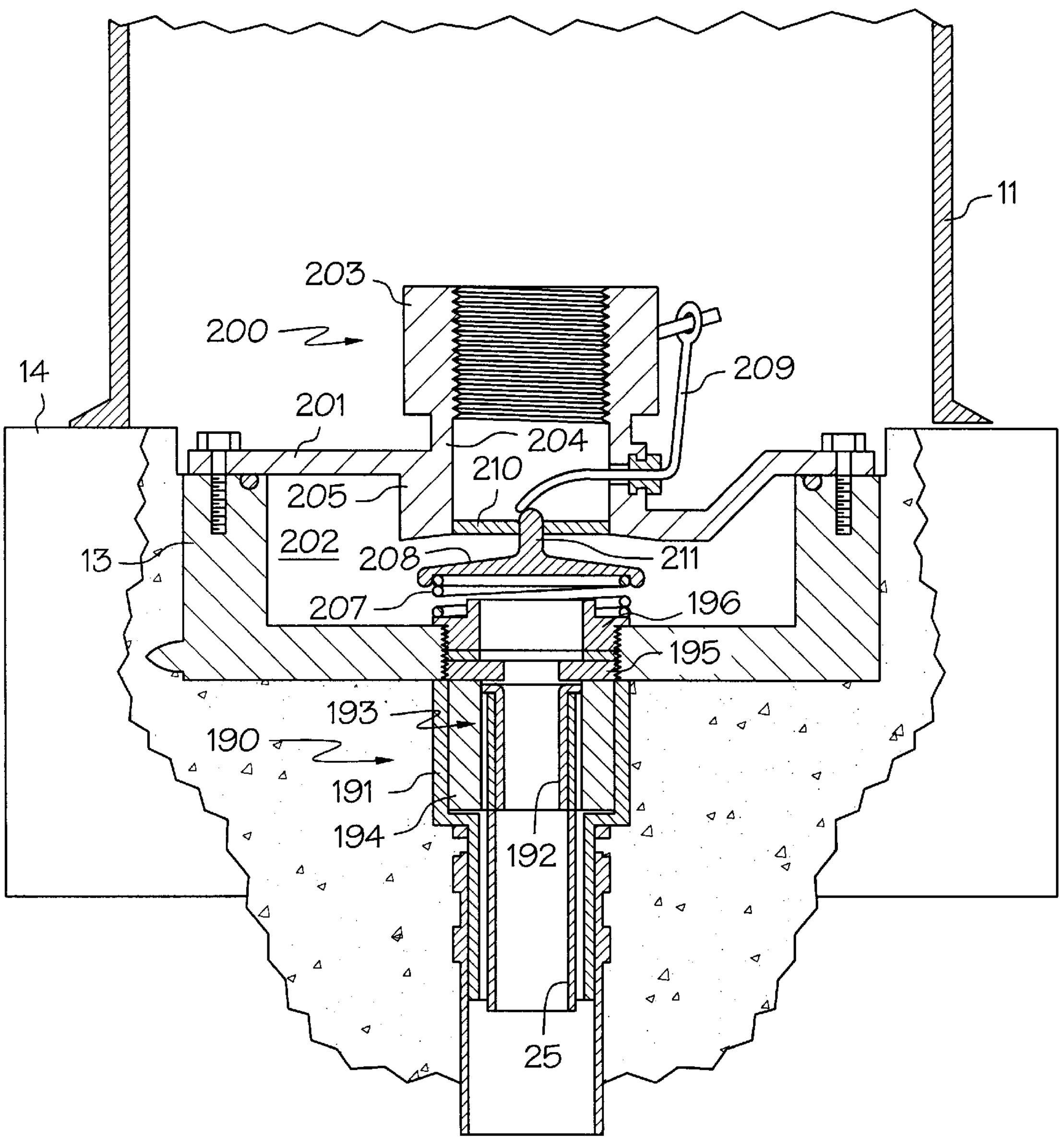
FIG. 13 is a side elevational view partially in section showing an adaptor assembly of the invention and a built-in safety shut-off valve.
Figure 14:
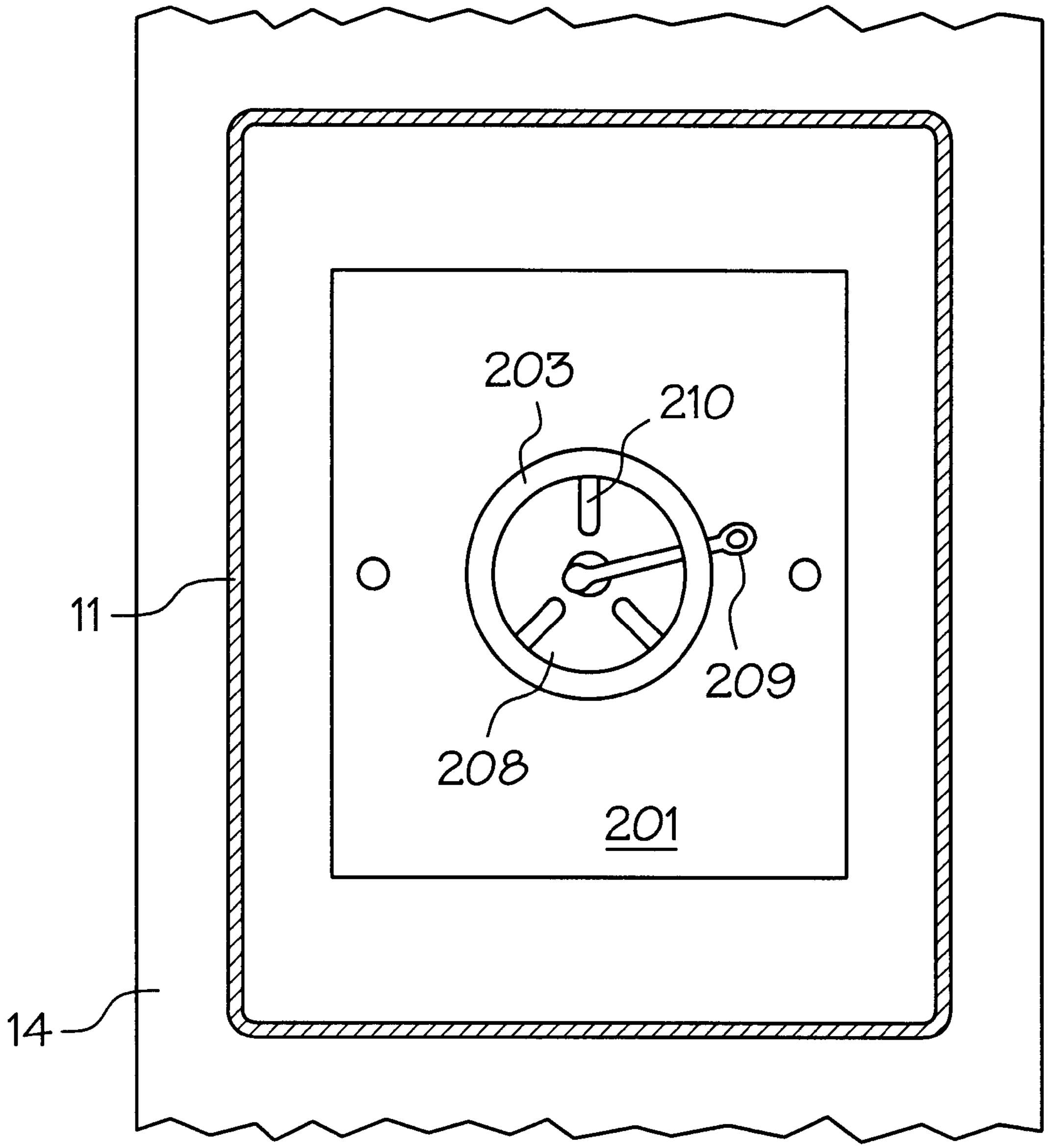
FIG. 14 is a top plan view partially in section of the adaptor assembly of FIG. 13.

FIGS. 13 and 14 depict an adaptor assembly of the invention with a built-in safety shut-off valve. The assembly 190 comprises a casing 191, a coupling 192 and a disengageable seal system 193. The casing 191 is similar in construction to the casing 91 of the adaptor assembly 90 of FIG. 6. The coupling 192 is a short tubular member which fits into a terminal end of the primary pipeline 25. It is described above in more detail with reference to FIG. 7 and coupling 112. The disengageable seal system 193 includes a compressible annular member 194 which provides a compression seal on both its inner wall surface which is in contact with the primary pipeline 25 and on its outer wall surface which is in contact with the casing 191. The annular member 194 is made of a compressible material, e.g. a synthetic elastomeric material and is dimensioned to fit at least partially into and substantially fill the space within the upper cylinder of the casing 191. An annular ram seat 195 fits over the coupling 192 and primary pipeline 25 and sits on top of the compressible annular member 194. The ram seat is an annular flat rigid member. A ram nut 196 is externally threaded to engage threads in a hole in the island form 13 and to impart a force onto the ram seat 195 to hold the compressible annular member 194 in place during use. While not necessary, the ram seat 195 prevents the compressible annular member 194 from spreading outwardly or inwardly and is preferably used for this reason.

The built-in safety shut-off valve 200 is adapted for use with the adaptor assemblies of the invention, including the adaptor assembly 190. The valve 200 is easy to install and is reliable. It comprises a plate member 201 dimensional to overlie a flow chamber 202 in the island form 13 and to be bolted thereto. A vertically extending break-away tube member 203 is positioned on the plate member 201. As evident, a base 204 of the tube member 203 is thin walled so that any force exerted on the tube member 203 will cause it to break or at least bend. The plate member as shown also has a lower vertically extending tube member 205 aligned with the upper tube member 203. Alternatively, the tube member can be eliminated and a bonnet value described below made to contact directly the lower terminus of the opening.

The safety shut-off valve 200 also includes a spring 207 and a bonnet valve 208 to mate with a lower opening of the lower tube member 205 to close it off. A trigger arm 209 is mounted in the lower tube member 205 and is operably associated with the bonnet valve 208. It holds the bonnet valve and spring down to permit flow of fuel through the primary pipeline, the shut-off valve and into the dispenser pipeline of the dispenser unit. The trigger arm, at least in an exposed area, is optionally made of a meltable material such as solder. In case of a fire, the solder melts to release the bonnet valve 208. A set of guide arms 210 extending substantially horizontally inwardly from a lower terminus of the lower tube member 205 receives a centered guide post 211 on the bonnet 208 to hold the bonnet in position.

It should be readily apparent that a bumping of sufficient force will cause the upper tube member 203 to bend or break-off and then trip the trigger arm 209. This in turn releases the bonnet valve 208 to cause it to move upwardly and effectively close off further liquid flow from the primary pipeline. Of particular importance, a complete unit is available which effectively prevents accidental spills while allowing ready access to the adaptor assembly and ultimately the primary pipeline.

While several embodiments of the invention have been described in detail and with reference to the drawings, still other embodiments to accomplish the same purpose are contemplated. Such embodiments and all changes or modifications of an obvious nature are considered within the scope of the appended claims.

I claim:

1. An adaptor assembly for operably connecting a terminus of a double wall pipeline system to a dispenser unit wherein the double wall pipeline system has a primary pipeline for conveying liquid from a storage tank to the dispenser unit and a secondary pipeline substantially concentric with the primary pipeline to form an annular space therebetween for containing any liquid leaked from the primary pipeline and further wherein the primary pipeline requires periodic replacement, said adaptor assembly comprising:

(a) a casing for attachment to a terminus of the secondary pipeline, said casing further being adapted for rigid mounting to a base of the dispenser unit to hold the secondary pipeline permanently in position; and (b) a disengageable seal system operably associated with the casing to terminate the annular space between the primary pipeline and the secondary pipeline of the double wall pipeline system in a liquid-tight manner to prevent flow of leaked liquid therefrom, said seal system further capable of allowing the primary pipeline to pass therethrough, whereby the seal system allows access to the primary pipeline for installation, removal and replacement purposes without having to disconnect the secondary pipeline from the casing.

2. The adaptor assembly of claim 1 wherein the casing has at least two staged cylinders, with an upper cylinder dimensioned to receive the disengageable seal system and a lower cylinder of extending axially from said upper cylinder and further wherein the secondary pipeline is permanently attached to said lower cylinder.

3. The adaptor assembly of claim 2 wherein the upper cylinder of the casing has an inwardly extending flange at a lower edge and the lower cylinder has a smaller diameter and extends axially from said flange.

4. The adaptor assembly of claim 3 wherein the disengageable seal system comprises a compressible annular member which fits at least partially within the upper cylinder of the casing and rests on the flange of the upper cylinder, said compressible annular member further having a hole extending vertically through it to receive the primary pipeline in a sealing member.

5. The adaptor assembly of claim 4 further comprising a ram seat positioned on a top surface of the compressible annular member and a ram nut positioned on the ram seat, said ram nut adapted for imparting a downward force on to the ram seat and a compressible force on the compressible annular member to make sealing contact with the casing and the primary pipeline.

6. The adaptor assembly of claim 2 wherein the casing's upper cylinder and the lower cylinder have the same approximate diameter and further has an inwardly extending flange to create a boundary line for the cylinders.

7. The adaptor assembly of claim 2 further comprising a bushing for connecting together the upper cylinder to the lower cylinder.

8. The adaptor assembly of claim 2 further comprising a coupling for attachment to the primary pipeline wherein the coupling has a tubular body which is dimensioned to fit within a terminus of the primary pipeline and is sealed thereto in a liquid-tight manner, said coupling further has an annular flange which extends radially from an upper end of said tubular body, said flange dimensioned to fit onto a shoulder formed by the inwardly extending flange of the casing's upper cylinder and further wherein the disengageable seal system comprises gaskets operably associated with the flange of the coupling and a ram nut to cause a downward force onto said gaskets to make sealing contact so as to terminate the annular space between the primary pipeline and the secondary pipeline.

9. The adaptor assembly of claim 1 wherein the disengageable seal system comprises (i) an O-ring annular retainer member dimensioned to fit at least partially into at least the upper cylinder of the casing, said retainer member having a hole in its center to receive the primary pipeline and further having O-ring grooves on an outer wall and on an inner wall, (ii) at least one O-ring fitted in each O-ring groove on the outer wall to make sealing contact with the casing and fitted in each O-ring groove on the inner wall to make sealing contact with the primary pipeline.

10. The adaptor assembly of claim 9 further wherein the disengageable seal system has a ram nut configured to fit over the primary pipeline and adapted to hold the O-ring annular retainer member in place.

11. The adaptor assembly of claim 1 further comprising a fitting which extends upwardly from the dispenser unit base, said fitting having internal threads to receive a safety shut-off valve.

12. The adaptor assembly of claim 1 further comprising a coupling for attachment to the primary pipeline, said coupling positioned at least partially within the casing.

13. The adaptor assembly of claim 1 further having a safety shut-off valve adapted for rigid mounting to the base of the dispenser unit and operably associated with the disengageable seal system.

14. The adaptor assembly of claim 13 wherein the safety shut-off valve comprises a plate member for mounting to the base of the dispenser unit, an upper tube member extending substantially vertically upwardly from the plate member and further said upper tube member has a thin walled break-away base, an opening extending substantially vertically through the plate member and in alignment with the upper tube member, a bonnet valve to prevent liquid flow into the upper tube member, and a trigger arm operably associated with the bonnet valve to release said bonnet valve upon encountering a sufficient force to cause the upper tube member to break or bend.

15. An adaptor assembly for operably connecting a terminus of a double wall pipeline system to a dispenser unit wherein the double wall pipeline system has a primary pipeline for conveying liquid from a storage tank to the dispenser unit and a secondary pipeline substantially concentric therewith to form an annular space for containing any liquid leaked from the primary pipeline and further wherein the connection is made in a manner whereby the primary pipeline is readily accessed, removed and replaced without having to disconnect the secondary pipeline from the adaptor assembly, said adaptor assembly comprising:

(a) a casing for attachment to a terminus of the secondary pipeline, said casing further being adapted for rigid mounting to a base of the dispenser unit to hold the secondary pipeline permanently in position;

(b) attachment means to hold the casing to the secondary pipeline in a liquid-tight manner;

(c) a coupling positioned at least partially within the casing to provide a flowpath for conveyance of liquid from the primary pipeline to the dispenser unit;

(d) attachment means to hold the coupling to the primary pipeline in a liquid-tight manner; and (e) a disengageable seal system operably associated with the casing and the coupling to terminate the annular space between the primary pipeline and secondary pipeline in a liquid-tight manner to prevent flow of leaked liquid therefrom.

16. The adaptor assembly of claim 15 wherein the casing has at least two staged cylinders, with an upper cylinder dimensioned to receive the disengageable seal system and a lower cylinder of smaller diameter extending axially from said upper cylinder and further wherein the secondary pipeline is permanently attached to said lower cylinder.

17. The adaptor assembly of claim 16 wherein the disengageable seal system comprises (i) a compressible annular member which fits at least partially within the upper cylinder of the casing, said compressible annular member further having a hole extending vertically through it to receive the primary pipeline in a sealing member, (ii) a ram seat positioned on a top surface of the compressible annular member and (iii) a ram nut positioned on the ram seat, said ram nut adapted for imparting a downward force on to the ram seat and a compressible force on the compressible annular member to make sealing contact with the casing and the primary pipeline.

18. The adaptor assembly of claim 16 wherein the disengageable seal system comprises (i) a compressible annular member which fits at least partially within the upper cylinder of the casing, said compressible annular member further having a hole extending vertically through it to receive the primary pipeline in a sealing member, (ii) a ram seat positioned on a top surface of the compressible annular member and (iii) an internally threaded fitting positioned on the dispenser unit base to receive a safety shut-off valve, said safety valve further imparting a downward force onto the ram seat to create a compressible force on the compressible annular member so as to make sealing contact with the casing and the primary pipeline.

19. An adaptor assembly for operably connecting a terminus of a double wall pipeline system to a dispenser unit wherein the double wall pipeline system has a primary pipeline for conveying liquid from a storage tank to the dispenser unit and a secondary pipeline substantially concentric therewith to form an annular space for containing any liquid leaked from the primary pipeline in a manner whereby the primary pipeline is readily accessed, removed and replaced without having to disconnect the secondary pipeline from the adaptor assembly, said assembly comprising:

(a) a casing for securing to a base of the dispenser unit, said casing having staged cylinders with (i) an upper stage cylinder for attachment to the base of the dispenser unit, (ii) a lower stage cylinder extending axially from the upper stage cylinder and dimensioned to engage the terminal end of the secondary pipeline of the double wall pipeline system and be sealed thereto, and (iii) a bushing connecting the upper stage cylinder to the lower stage cylinder;

(b) a flanged coupling for positioning at least partially within the casing, said coupling configured to engage the primary pipeline of the double wall pipeline system and be sealed thereto; and (c) a ram nut for forcing the flanged coupling into a compressive sealing engagement to terminate the annular space between the primary pipeline and the secondary pipeline so as to contain leaked liquid therewithin, further said ram nut having a substantially centrally disposed hole for allowing liquid from the primary pipeline to pass therethrough.

20. The adaptor assembly of claim 19 wherein the coupling has a tubular body dimensioned to fit within the primary pipeline and an annular flange extending from a terminus of the tubular body whereby liquid from the primary pipeline flows therethrough to the dispenser unit.

21. The adaptor assembly of claim 19 further comprising an underlying gasket for positioning in the base of the dispenser unit and to receive thereon the annular flange of the coupling's tubular body and an overlying gasket for positioning on top of the annular flange for making sealing contact with the ram nut.

22. An adaptor assembly for connecting a terminus of a double wall pipeline system to a dispenser unit wherein the double wall pipeline system has a primary pipeline for conveying liquid from a storage tank to the dispenser unit and a secondary pipeline substantially concentric therewith to form an annular space for containing any liquid leaked from the primary pipeline in a manner whereby the primary pipeline is readily accessed, removed and replaced without having to disconnect the secondary pipeline from the adaptor assembly, said adaptor assembly comprising:

(a) a casing having an upper cylinder for rigid mounting to a base of the dispenser unit to hold the secondary pipeline permanently in position and a lower cylinder for attachment to a terminus of the secondary pipeline;

(b) attachment means to hold the casing to the secondary pipeline in a liquid-tight fashion;

(c) a coupling positioned within the casing to provide a flowpath for conveyance of liquid from the primary pipeline;

(d) attachment means to hold the coupling to the primary pipeline in a liquid-tight manner; and (e) a disengageable seal system operably associated with the casing and the coupling to terminate the annular space between the primary pipeline and the secondary pipeline in a liquid-tight manner to prevent flow of leaked liquid therefrom, said seal system having (i) an O-ring annular retainer member dimensioned to fit at least partially within the upper cylinder of the casing with a centered hole to receive the primary pipeline, and (ii) O-rings positioned on the outside wall for sealing contact with the casing and O-rings positioned on the inside wall for sealing contact with the primary pipeline.

23. The adaptor assembly of claim 22 further comprising a bushing for connecting together the upper cylinder to the lower cylinder.

24. The adaptor assembly of claim 23 wherein the coupling is a tubular member dimensioned to fit within a terminal end of the primary pipeline and has a set of upper external threads and further comprising a retention nut with internal threads to thread onto the external threads of the tubular member to engage the O-ring annular retainer member.

25. The adaptor assembly of claim 24 wherein the O-ring annular retainer member has O-ring grooves on an outside wall and on an inside wall to receive the O-rings.

26. An adaptor assembly for connecting a terminus of a double wall pipeline system to a dispenser unit wherein the double wall pipeline system has a primary pipeline for conveying liquid from a storage tank to the dispenser unit and a secondary pipeline substantially concentric therewith to form an annular space for containing any liquid leaked from the primary pipeline in a manner whereby the primary pipeline is readily accessed, removed and replaced without having to disconnect the secondary pipeline from the adaptor assembly, said adaptor assembly comprising:

(a) a casing having an upper cylinder adapted for rigid mounting to a base of the dispenser unit and a lower cylinder extending axially from the upper cylinder for attachment to a terminus of the secondary pipeline to hold the secondary pipeline permanently in position;

(b) attachment means to hold the casing to the secondary pipeline in a liquid-tight fashion;

(c) a coupling positioned at least partially within the casing to provide a flowpath for conveyance of liquid from the primary pipeline;

(d) attachment means to hold the coupling to the primary pipeline in a liquid-tight manner; and (e) a disengageable seal system operably associated with the casing and the coupling to terminate the annular space between the primary pipeline and the secondary pipeline in a liquid-tight manner to prevent flow of leaked liquid therefrom, said seal system comprising a compressible annular member dimensioned to fit at least partially within the upper cylinder of the casing and having a centered hole for receiving the primary pipeline.

27. The adaptor assembly of claim 26 further comprising a ram seat to contact a top surface of the compressible annular member and a ram nut adapted to impart a downward force onto the ram seat to create a compressible force in the compressible annular member to make sealing contact with the casing and with the primary pipeline.

28. The adaptor assembly of claim 27 further having a safety shut-off valve adapted for rigid mounting to the base of the dispenser unit and operably associated with the disengageable seal system.

29. The adaptor assembly of claim 28 wherein the safety shut-off valve comprises a plate member for mounting to the base of the dispenser unit, an upper tube member extending substantially vertically upwardly from the plate member and further said upper tube member has a thin walled breakaway base, a lower tube member extending substantially vertically downwardly from the plate member and in alignment with the upper tube member, a spring-loaded bonnet valve dimensioned to cover the terminus of the lower tube member to prevent liquid flow into the upper tube member, and a trigger arm operably associated with the spring-loaded bonnet valve to release said bonnet upon encountering a sufficient force to cause the upper tube member to break or bend and further wherein the spring-loaded bonnet valve of the safety shut-off valve includes a spring tube form dimensioned to sit on the annular ram seat, and a coil spring encompassing the spring tube form and to contact the bonnet to force said bonnet valve upwardly upon occurrence of a force sufficiently great to trip the trigger arm.

30. An adaptor assembly for operably connecting a terminus of a double wall pipeline system to a dispenser unit wherein the double wall pipeline system has a primary pipeline for conveying liquid from a storage tank to the dispenser unit and a secondary pipeline substantially concentric with the primary pipeline to form an annular space therebetween for containing any liquid leaked from the primary pipeline and further wherein a proximal terminus of the secondary pipeline at the dispenser unit is non-accessible for ready disconnection purposes and the primary pipeline requires periodic replacement, said adaptor assembly comprising:

(a) a casing for attachment to a terminus of the secondary pipeline, said casing further being adapted for rigid mounting to a base of the dispenser unit to hold the secondary pipeline permanently in position; and (b) a disengageable seal system operably associated with the casing to terminate the annular space between the primary pipeline and the secondary pipeline of the double wall pipeline system in a liquid-tight manner to prevent flow of leaked liquid therefrom, said seal system having a tubular body with a set of lower external threads to engage the primary pipeline in a liquid-tight manner and a set of upper external threads to receive a safety shut-off valve, whereby the tubular member allows access to the primary pipeline for installation, removal and replacement purposes without having to disconnect the secondary pipeline from the casing.

31. The adaptor assembly of claim 30 wherein the casing is a straight tubular member dimensioned to fit between the secondary pipeline and the primary pipeline and further wherein the tubular member has a tapered lower end for installation purposes.

32. An adaptor assembly for operably connecting a terminus of a double wall pipeline system to a dispenser unit wherein the double wall pipeline system has a primary pipeline for conveying liquid from a storage tank to the dispenser unit and a secondary pipeline substantially concentric therewith to form an annular space for containing any liquid leaked from the primary pipeline and further wherein the connection is made in a manner whereby the primary pipeline is readily accessed, removed and replaced without having to disconnect the secondary pipeline from the adaptor assembly, said adaptor assembly comprising:

(a) a casing for attachment to a terminus of the secondary pipeline, said casing further being adapted for rigid mounting to a base of the dispenser unit to hold the secondary pipeline permanently in position;

(b) attachment means to hold the casing to the secondary pipeline in a liquid-tight fashion;

(c) a coupling positioned at least partially within the casing for attachment in a liquid-tight fashion to terminus of the primary pipeline to provide a flowpath for conveyance of liquid from the primary pipeline to the dispenser unit;

(d) attachment means to hold the coupling to the primary pipeline in a liquid-tight manner; and (e) disengageable seal system to terminate the annular space between the primary pipeline and secondary pipeline in a liquid-tight manner to prevent flow of leaked liquid therefrom, said seal system being a flange extending from the coupling and a bolted ram seat system operably associated with the casing.

33. The adaptor assembly of claim 32 wherein the casing has a tubular member dimensioned to snugly fit within the secondary pipeline and further has a rigid flat base plate attached at a terminus of the tubular member with a hole extending therethrough to accommodate the coupling and the primary pipeline.

34. The adaptor assembly of claim 33 wherein the coupling has a tubular member dimensioned to fit within the primary pipeline and further has its flange attached at a terminus of said tubular member.

35. The adaptor assembly of claim 34 wherein the rigid flat base plate of the casing has an upwardly extending anchor member which creates an approximately centered recess in the flat base plate and the diameter of the flange of the coupling approximates the diameter of the recess to sit therein and further comprising a ram seat to fit within the recess and on the flange of the coupling and a hold-down plate overlying the ram seat to form the disengageable seal system.

* * * * *